US012811749B2

(12) United States Patent
Matsumura et al.

(10) Patent No.: US 12,811,749 B2
(45) Date of Patent: Nov. 24, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 223 days.

(21) Appl. No.: 18/695,243

(22) PCT Filed: Sep. 29, 2021

(86) PCT No.: PCT/JP2021/035947

§ 371 (c)(1),
(2) Date: Mar. 25, 2024

(87) PCT Pub. No.: WO2023/053291

PCT Pub. Date: Apr. 6, 2023

(65) Prior Publication Data

US 2024/0275560 A1 Aug. 15, 2024

(51) Int. Cl.
*H04L 5/00* (2006.01)
*H04W 72/1273* (2023.01)
*H04W 72/232* (2023.01)

(52) U.S. Cl.
CPC ....... *H04L 5/0053* (2013.01); *H04W 72/1273* (2013.01); *H04W 72/232* (2023.01)

(58) Field of Classification Search
CPC ...... H04L 5/003; H04L 5/0053; H04W 72/12; H04W 72/1263; H04W 72/1273; H04W 72/20; H04W 72/23; H04W 72/232; H04W 16/24; H04W 16/28; H04B 7/0695; H04B 7/06952; H04B 7/06968
See application file for complete search history.

(56) References Cited

U.S. PATENT DOCUMENTS

2022/0394742 A1* 12/2022 Jang .......................... H04L 1/08
2023/0396308 A1* 12/2023 Mei ...................... H04B 7/0626

OTHER PUBLICATIONS

ZTE, "Discussion on Multi-TRP HST enhancements", Aug. 16-27, 2021, 3GPP TSG RAN WG1 #106-e, R1-2106545, pp. 1-13 (Year: 2021).*
Vivo, "Further discussion and evaluation on HST-SFN schemes", Aug. 16-27, 2021, 3GPP TSG RAN WG1 #106-e, R1-2106575, pp. 1-13 (Year: 2021).*

(Continued)

*Primary Examiner* — Paul H. Masur
(74) *Attorney, Agent, or Firm* — Osha Bergman Watanabe & Burton LLP

(57) ABSTRACT

A terminal according to one aspect of the present disclosure includes: a control section that determines a transmission configuration indication (TCI) state to apply to a physical downlink shared channel (PDSCH), based on at least one of whether Doppler pre-compensation is applied to the PDSCH, a frequency range, a magnitude relation between an offset from reception of downlink control information (DCI) for scheduling the PDSCH to reception of the PDSCH and a threshold value, and the DCI; and a receiving section that receives the PDSCH by using the TCI state. According to one aspect of the present disclosure, operation related to a TCI state/default TCI state can be appropriately controlled.

7 Claims, 15 Drawing Sheets

(56) References Cited

OTHER PUBLICATIONS

Sony, "Enhancement on HST-SFN deployment", Aug. 16-27, 2021, 3GPP TSG RAN WG1#106e, R1-2106792, pp. 1-6 (Year: 2021).*
Futurewei, "Enhancement to support HST-SFN deployment scenario", Aug. 16-27, 2021, 3GPP TSG RAN WG1 Meeting #106-e, R1-2107082, pp. 1-11 (Year: 2021).*
Lenovo et al., "Enhancements for HST-SFN deployment", Aug. 16-27, 2021, 3GPP TSG RAN WG1 #106-e, R1-2107178, pp. 1-13 (Year: 2021).*
Qualcomm, "Enhancements on HST-SFN deployment", Aug. 16-27, 2021, 3GPP TSG-RAN WG1 Meeting #106-e, R1-2107327, pp. 1-48 (Year: 2021).*
Ericsson, "Enhancement on HST-SFN deployment", Aug. 16-27, 2021, 3GPP TSG-RAN WG1 Meeting #106-e, R1-2107625 , pp. 1-30 (Year: 2021).*
Nokia, "Enhancements for HST-SFN deployment", Aug. 16-27, 2021, 3GPP TSG RAN WG1 #105-e Meeting, R1-2108056, pp. 1-14 (Year: 2021).*
Sattar et al., "Performance Evaluation of Transmission Schemes for High-Speed Train Communications", Sep. 27-30, 2021, 2021 IEEE 94th Vehicular Technology Conference (VTC2021-Fall), DOI: 10.1109/VTC2021-Fall52928.2021.9625296, pp. 1-6 (Year: 2021).*
Merriam-Webster, "Dictionary Definition: when", 2026, https://www.merriam-webster.com/dictionary/when (Year: 2026).*
International Search Report issued in PCT/JP2021/035947 on May 17, 2022 (3 pages).
Written Opinion of the International Searching Authority issued in PCT/JP2021/035947 on May 17, 2022 (3 pages).
LG Electronics; "Enhancements on HST-SFN deployment"; 3GPP TSG RAN WG1 #106-e, R1-2107818; e-Meeting; Aug. 16-27, 2021 (9 pages).
Convida Wireless; "On Enhancements for HST-SFN deployment"; 3GPP TSG-RAN WG1 #106-e, R1-2108022; e-Meeting; Aug. 16-27, 2021 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

BBU#0
BBU#1
TRP#0
TRP#1
TRP#2
TRP#3
TRP#4
TRP#5
TRP#6
TRP#7
TRP#8
TRP#9
TRP#10
TRP#11
TRP#12
TRP#13
TRP#14
TRP#15
RRH#0
RRH#1
RRH#2
RRH#3
RRH#4
RRH#5
RRH#6
RRH#7
UE
MOVING OBJECT (INCLUDING UE THEREIN)
MOVEMENT PATH

RECEIVED SIGNAL STRENGTH
FREQUENCY
-fD
0
+fD

RECEIVED SIGNAL STRENGTH
FREQUENCY
0

ACTIVE TCI STATE LIST FOR PDSCH

| TCI field codepoint | 1st TCI state | 2nd TCI state |
|---|---|---|
| 000 | TCI state #0 | - |
| 001 | TCI state #1 | - |
| 010 | TCI state #2 | - |
| 011 | TCI state #3 | - |
| 100 | TCI state #4 | TCI state #5 |
| 101 | TCI state #6 | TCI state #7 |
| 110 | TCI state #8 | TCI state #9 |
| 111 | TCI state #10 | TCI state #11 |

FIG. 8

ACTIVE TCI STATE LIST FOR PDSCH

| TCI field codepoint | 1st TCI state | 2nd TCI state |
|---|---|---|
| 000 | TCI state #0 | - |
| 001 | TCI state #1 | - |
| 010 | TCI state #2 | - |
| 011 | TCI state #3 | - |
| 100 | TCI state #4 | TCI state #5 |
| 101 | TCI state #6 | TCI state #7 |
| 110 | TCI state #8 | TCI state #9 |
| 111 | TCI state #10 | TCI state #11 |

DEFAULT TCI STATE

FIG. 9

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as “5th generation mobile communication system (5G),” “5G+(plus),” “6th generation mobile communication system (6G),” “New Radio (NR),” “3GPP Rel. 15 (or later versions),” and so on) are also under study.

CITATION LIST

Non-Patent Literature

Non-Patent Literature 1: 3GPP TS 36.300 V8.12.0 “Evolved Universal Terrestrial Radio Access (E-UTRA) and Evolved Universal Terrestrial Radio Access Network (E-UTRAN); Overall description; Stage 2 (Release 8),” April, 2010

SUMMARY OF INVENTION

Technical Problem

For future radio communication systems (for example, NR), it is studied to configure a method of receiving a physical downlink control channel (PDCCH) for a control resource set (CORESET) to enable higher reliability and high-speed movement.

However, it is not sufficiently studied how to apply a TCI state/default TCI state in a terminal (user terminal, User Equipment (UE)) in some cases. In such a case, degradation in communication quality, throughput reduction, and the like may occur.

Thus, an object of the present disclosure is to provide a terminal, a radio communication method, and a base station that appropriately control operation related to a TCI state/default TCI state.

Solution to Problem

A terminal according to one aspect of the present disclosure includes: a control section that determines a transmission configuration indication (TCI) state to apply to a physical downlink shared channel (PDSCH), based on at least one of whether Doppler pre-compensation is applied to the PDSCH, a frequency range, a magnitude relation between an offset from reception of downlink control information (DCI) for scheduling the PDSCH to reception of the PDSCH and a threshold value, and the DCI; and a receiving section that receives the PDSCH by using the TCI state.

Advantageous Effects of Invention

According to one aspect of the present disclosure, operation related to a TCI state/default TCI state can be appropriately controlled.

BRIEF DESCRIPTION OF DRAWINGS

FIG. 8 is a diagram to show an example of an active TCI state list.

FIG. 9 is a diagram to show an example of determination of a TCI state in a first embodiment.

Figure 1:
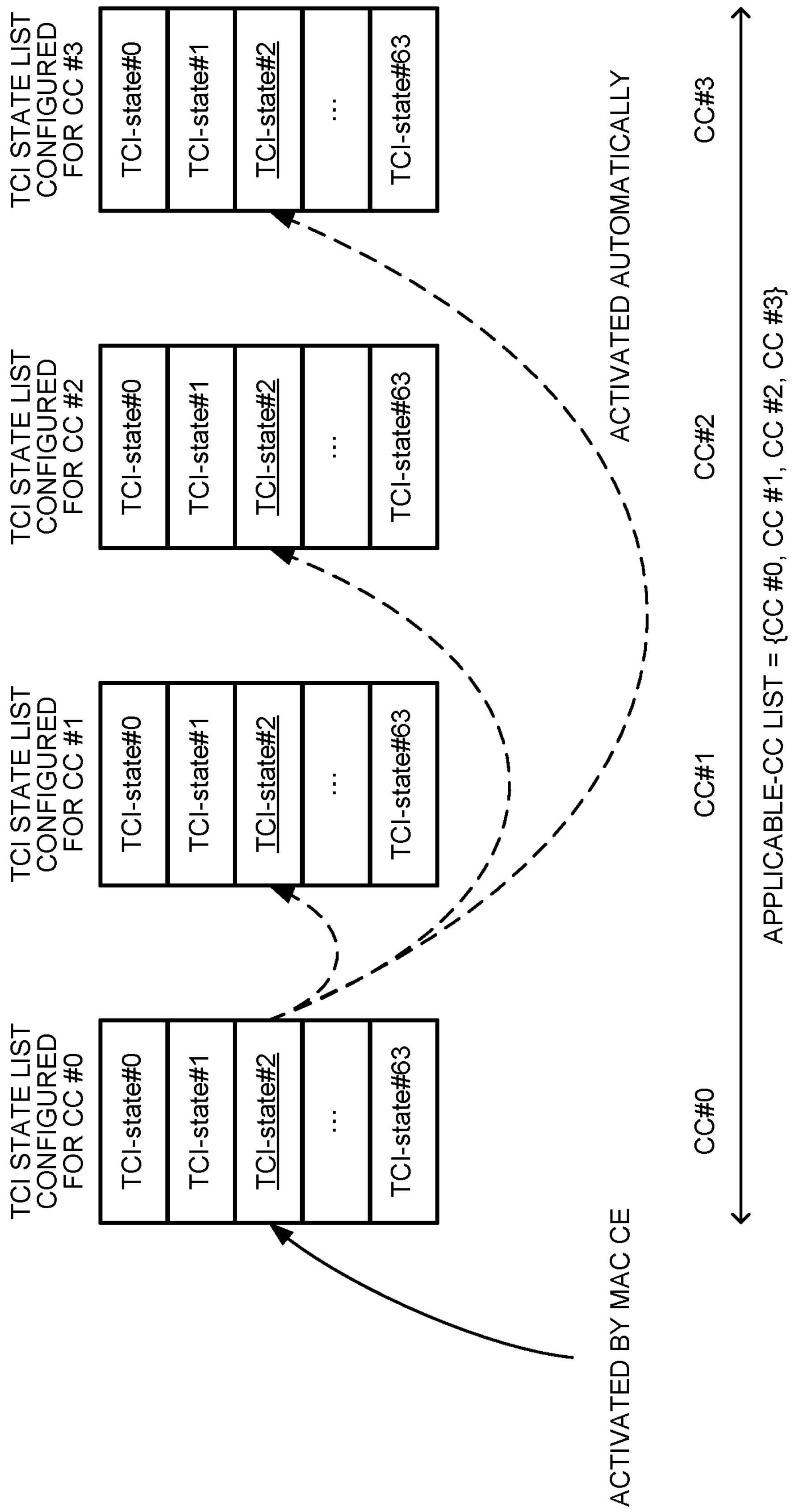
FIG. 1 is a diagram to show an example of simultaneous beam updates over a plurality of CCs.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE, based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a certain channel/signal, and this RS may be referred to as a QCL source of QCL type X in the TCI state.

(Pathloss RS)

Pathloss $PL_{b,f,c}(q_d)$ [dB] in transmission power control of each of a PUSCH, a PUCCH, and an SRS is calculated by the UE by using an index $q_d$ of a reference signal (RS, pathloss reference RS) (PathlossReferenceRS) for downlink BWP associated with an active UL BWP b of a carrier f in a serving cell c. In the present disclosure, a pathloss reference RS, a pathloss (PL)-RS, an index $q_d$, an RS used for pathloss calculation, and an RS resource used for pathloss calculation may be interchangeably interpreted. In the present disclosure, calculation, estimation, measurement, and track may be interchangeably interpreted.

It is studied whether to change, when a pathloss RS is updated by a MAC CE, an existing mechanism of a higher layer filtered RSRP for pathloss measurement.

When a pathloss RS is updated by a MAC CE, pathloss measurement based on an L1-RSRP may be applied. At available timing after the MAC CE for the update of the pathloss RS, a higher layer filtered RSRP may be used for the pathloss measurement, and an L1-RSRP may be used for the pathloss measurement before application of the higher layer filtered RSRP. At available timing after the MAC CE for the update of the pathloss RS, a higher layer filtered RSRP may be used for the pathloss measurement, and, at timing before this, a higher layer filtered RSRP of a previous pathloss RS may be used. Similar to Rel-15 operation, the higher layer filtered RSRP may be used for the pathloss measurement, and the UE may track all the pathloss RS candidates configured by RRC. The maximum number of pathloss RSs configurable by RRC may depend on UE capability. When the maximum number of pathloss RSs configurable by RRC is X, X or less pathloss RS candidates may be configured by RRC, and the pathloss RS may be selected by the MAC CE from among the configured pathloss RS candidates. The maximum number of pathloss RSs configurable by RRC may be four, eight, 16, 64, or the like.

In the present disclosure, a higher layer filtered RSRP, a filtered RSRP, and a layer 3 filtered RSRP may be interchangeably interpreted.

(Default TCI State/Default Spatial Relation/Default PL-RS)

In Rel. 16, a PDSCH may be scheduled by DCI including a TCI field. A TCI state for the PDSCH is indicated by the TCI field. The TCI field of DCI format 1-1 is composed of three bits, and the TCI field of DCI format 1-2 is composed of three bits at maximum.

In RRC connected mode, when a first information element of TCI in DCI (higher layer parameter tci-PresentInDCI) is set at "enabled" for a CORESET for scheduling the PDSCH, the UE assumes that a TCI field is present in DCI format 1_1 of a PDCCH transmitted in the CORESET.

If a second information element of TCI in DCI (higher layer parameter tci-PresentInDCI-1-2) for the CORESET for scheduling the PDSCH is configured for the UE, the UE assumes that a TCI field having a DCI field size indicated by the second information element of TCI in DCI is present in DCI format 1_2 of the PDSCH transmitted in the CORESET.

In Rel. 16, the PDSCH may be scheduled by DCI not including a TCI field. The DCI format of the DCI may be DCI format 1_0 or DCI format 1_1/1_2 in a case where an information element of TCI in DCI (higher layer parameter tci-PresentInDCI or tci-PresentInDCI-1-2) is not configured (enabled). The PDSCH is scheduled by DCI not including a TCI field, and if a time offset between reception of DL DCI (DCI for scheduling the PDSCH (scheduling DCI)) and the corresponding PDSCH (PDSCH scheduled by the DCI) is a threshold value (timeDurationForQCL) or more, the UE assumes that a TCI state or QCL assumption for the PDSCH is the same as the TCI state or QCL assumption of a CORESET (for example, the scheduling DCI) (default TCI state).

In the RRC connected mode, when the time offset between reception of the DL DCI (DCI for scheduling the PDSCH) and the corresponding PDSCH (PDSCH scheduled by the DCI) is smaller than the threshold value (timeDurationForQCL) in both a case where the information element of TCI in DCI (higher layer parameter tci-PresentInDCI and tci-PresentInDCI-1-2) is set at "enabled" and a case where the information element of TCI in DCI is not configured (application condition, first condition), the TCI state of the PDSCH (default TCI state) may be the TCI state corresponding to the lowest CORESET ID in the newest slot in an active DL BWP in the CC (specific UL signal) in a case of non-cross-carrier scheduling. Otherwise, the TCI state of the PDSCH (default TCI state) may be the TCI state of the lowest TCI state ID of the PDSCH in the active DL BWP in a scheduled CC.

In Rel. 15, individual MAC CEs, specifically, a MAC CE for activation/deactivation of a PUCCH spatial relation and a MAC CE for activation/deactivation of an SRS spatial relation, are needed. The PUSCH spatial relation follows the SRS spatial relation.

In Rel. 16, at least one of the MAC CE for activation/deactivation of a PUCCH spatial relation and the MAC CE for activation/deactivation of an SRS spatial relation need not be used.

If neither a spatial relation nor a PL-RS for a PUCCH is configured in FR2 (application condition, second condition), default assumptions for a spatial relation and a PL-RS (default spatial relation and default PL-RS) are applied to the PUCCH. If neither a spatial relation nor a PL-RS for an SRS (SRS resource for an SRS or SRS resource corresponding to an SRI in DCI format 0_1 for scheduling a PUSCH) is configured in FR2 (application condition, second condition), default assumptions for a spatial relation and a PL-RS (default spatial relation and default PL-RS) are applied to the PUSCH scheduled by DCI format 0_1 and the SRS.

If a CORESET is configured in the active DL BWP in the CC (application condition), the default spatial relation and the default PL-RS may be the TCI state or the QCL assumption of the CORESET having the lowest CORESET ID in the active DL BWP. If a CORESET is not configured in the active DL BWP in the CC, the default spatial relation and the default PL-RS may be the active TCI state having the lowest ID of the PDSCH in the active DL BWP.

In Rel. 15, the spatial relation of the PUSCH scheduled by DCI format 0_0 follows the spatial relation of the PUCCH resource having the lowest PUCCH resource ID among the active spatial relations of the PUCCHs on the same CC. A network need update all the PUCCH spatial relations of an SCell even when the PUCCH is not transmitted in the SCell.

In Rel. 16, no PUCCH configuration for a PUSCH scheduled by DCI format 0_0 is needed. When no active PUCCH spatial relation or no PUCCH resource is present in the active UL BWP in the CC for the PUSCH scheduled by DCI format 0_0 (application condition, second condition), the default spatial relation and the default PL-RS are applied to the PUSCH.

Application conditions of a default spatial relation/default PL-RS for SRS may include that an enable default beam pathloss information element for SRS (higher layer parameter enableDefaultBeamPlForSRS) is set at enabled. Application conditions of a default spatial relation/default PL-RS for PUCCH may include that an enable default beam pathloss information element for PUCCH (higher layer parameter enableDefaultBeamPlForPUCCH) is set at enabled. Application conditions of the default spatial relation/default PL-RS for PUSCH scheduled by DCI format 0_0 may include that an enable default beam pathloss information element for PUSCH scheduled by DCI format 0_0 (higher layer parameter enableDefaultBeamPlForPUSCH0_0) is set at enabled.

In Rel. 16, when an RRC parameter (parameter that enables a default beam PL for PUCCH (enableDefaultBeamPL-ForPUCCH), a parameter that enables a default beam PL for PUSCH (enableDefaultBeamPL-ForPUSCH0_0), or a parameter that enables a default beam PL for SRS (enableDefaultBeamPL-ForSRS)) is configured while a spatial relation or a PL-RS is not configured for the UE, the UE applies the default spatial relation/PL-RS.

The threshold value may be referred to as a time duration for QCL, "timeDurationForQCL," "Threshold," "Threshold for offset between a DCI indicating a TCI state and a PDSCH scheduled by the DCI," "Threshold-Sched-Offset," "beamSwitchTiming," a schedule offset threshold value, a scheduling offset threshold value, and the like. The threshold value may be reported by the UE as UE capability (for each subcarrier spacing).

When an offset between reception of DL DCI and a corresponding PDSCH is smaller than a threshold value timeDurationForQCL, at least one TCI state configured for the serving cell of the scheduled PDSCH includes "QCL type D," the UE is configured with an enable two-default TCI information element (enableTwoDefaultTCIStates-r16), and at least one TCI codepoint (codepoint in the TCI field in the DL DCI) indicates two TCI states, the UE assumes that a PDSCH of the serving cell or the DMRS port of a PDSCH transmission occasion is QCLed (quasi co-located) with an RS related to a QCL parameter associated with the two TCI states corresponding to the lowest codepoint of TCI codepoints including two different TCI states (two-default QCL assumption determination rule). Enable two-default TCI information element indicates enabling of Rel-16 operation of two default TCI states for PDSCH when at least one TCI codepoint is mapped to two TCI states.

As default TCI states for PDSCH in Rel. 15/16, specifications of a default TCI state for a single TRP, a default TCI state for multi-TRP based on multi-DCI, and a default TCI state for multi-TRP based on single DCI have been drafted.

As default TCI states for aperiodic CSI-RS (A-CSI-RS) in Rel. 15/16, specifications of a default TCI state for a single TRP, a default TCI state for multi-TRP based on multi-DCI, and a default TCI state for multi-TRP based on single DCI have been drafted.

In Rel. 15/16, specifications of a default spatial relation and a default PL-RS for each of PUSCH/PUCCH/SRS have been drafted.

(Simultaneous Beam Update Over Plurality of CCs)

In Rel. 16, one MAC CE can update beam indices (TCI states) of a plurality of CCs.

The UE can be configured with up to two applicable-CC lists (for example, applicable-CC-list) by RRC. When two applicable-CC lists are configured, the two respective applicable-CC lists may correspond to intra-band CA in FR1 and intra-band CA in FR2.

A PDCCH TCI state activation MAC CE activates the TCI states associated with the same CORESET ID of all the BWPs/CCs in the applicable-CC lists.

A PDSCH TCI state activation MAC CE activates the TCI states of all the BWPs/CCs in the applicable-CC lists.

An A-SRS/SP-SRS spatial relation activation MAC CE activates the spatial relations associated with the same SRS resource ID of all the BWPs/CCs in the applicable-CC lists.

In the example in FIG. 1, the UE is configured with an applicable-CC list indicating CCs #0, #1, #2, and #3 and a list indicating 64 TCI states for a CORESET or a PDSCH of each CC. When one TCI state of CC #0 is activated by a MAC CE, corresponding TCI states are activated in CCs #1, #2, and #3.

It is studied that such simultaneous beam update is applicable only to a single-TRP case.

For a PDSCH, the UE may be based on procedure A below.

{Procedure A}

The UE receives an activation command for mapping up to eight TCI states to a codepoint of a DCI field (TCI field) in one CC/DL BWP or in one set of CCs/BWPs. When one set of TCI state IDs is activated for one set of CCs/DL BWPs, a CC-applicable list is then determined by a CC indicated in the activation command, and the same set of TCI states is applied to all the DL BWPs in the indicated CC. Only if the UE is not provided with a plurality of values having different CORESET pool indices (CORESETPoolIndex) in a CORESET information element (ControlResourceSet) and is not provided with at least one TCI codepoint mapped to two TCI states, the one set of TCI state IDs can be activated for one set of CCs/DL BWPs.

For a PDCCH, the UE may be based on procedure B below.

{Procedure B}

If the UE is provided with up to two lists of cells for simultaneous TCI state activation by a simultaneous TCI update list (at least one of simultaneousTCI-UpdateList-r16 and simultaneousTCI-UpdateListSecond-r16), by a simultaneous TCI cell list (simultaneousTCI-CellList), the UE applies antenna port quasi co-location (QCL) provided by TCI states having the same activated TCI state ID value, to CORESETs having an index p in all the configured DL BWPs of all the configured cells in one list determined from a serving cell index provided by a MAC CE command. Only if the UE is not provided with a plurality of values having different CORESET pool indices (CORESETPoolIndex) in a CORESET information element (ControlResourceSet) and is not provided with at least one TCI codepoint mapped to two TCI states, the simultaneous TCI cell list can be provided for simultaneous TCI state activation.

The UE may be based on procedure C below for semi-persistent (SP)/aperiodic (AP)-SRS.

{Procedure C}

When spatial relation information (spatialRelationInfo) for an SP or AP-SRS resource configured by an SRS resource information element (higher layer parameter SRS-Resource) is activated/updated for one set of CCs/BWPs by a MAC CE, a CC-applicable list is then indicated by a simultaneous spatial update list (higher layer parameter simultaneousSpatial-UpdateList-r16 or simultaneousSpatial-UpdateListSecond-r16), and the spatial relation information is applied to SP or AP-SRS resources having the same SRS resource ID in all the BWPs in the indicated CC. Only if the UE is not provided with a plurality of values having different CORESET pool indices (CORESETPoolIndex) in a CORESET information element (ControlResourceSet) and is not provided with at least one TCI codepoint mapped to two TCI states, spatial relation information (spatialRelationInfo) for an SP or an AP-SRS resource configured by an SRS resource information element (higher layer parameter SRS-Resource) is activated/updated by a MAC CE for one set of CCs/BWPs.

A simultaneous TCI cell list (simultaneousTCI-CellList), a simultaneous TCI update list (at least one of simultaneousTCI-UpdateList1-r16 and simultaneousTCI-UpdateList2-r16) are lists of serving cells for which TCI relations can be updated simultaneously by using a MAC CE. simultaneousTCI-UpdateList1-r16 and simultaneousTCI-UpdateList2-r16 include no same serving cell.

A simultaneous spatial update list (at least one of higher layer parameters simultaneousSpatial-UpdatedList1-r16 and simultaneousSpatial-UpdatedList2-r16) is a list of serving cells for which spatial relations can be updated simultaneously by using a MAC CE. simultaneousSpatial-UpdatedList1-r16 and simultaneousSpatial-UpdatedList2-r16 include no same serving cell.

Here, the simultaneous TCI update list and the simultaneous spatial update list are configured by RRC, the CORESET pool index of a CORESET is configured by RRC, and a TCI codepoint mapped to a TCI state is indicated by a MAC CE.

(Unified/Common TCI Framework)

By a unified TCI framework, UL and DL channels can be controlled by a common framework. The unified TCI framework may indicate a common beam (common TCI state) and apply the common beam to all the UL and DL channels or may apply a common beam for UL to all the UL channels while applying a common beam for DL to all the DL channels, instead of defining a TCI state or a spatial relation for each channel as in Rel. 15.

One common beam for both DL and UL or a common beam for DL and a common beam for UL (two common beams in total) are studied.

The UE may assume the same TCI state (joint TCI state, joint TCI pool, joint common TCI pool, joint TCI state set) for UL and DL. The UE may assume respective different TCI states for UL and DL (separate TCI state, separate TCI pool, a UL separate TCI pool and a DL separate TCI pool, a separate common TCI pool, and UL common TCI pool and a DL common TCI pool).

By beam management based on a MAC CE (MAC-CE-level beam indication), UL and DL default beam may be matched. A default TCI state for a PDSCH may be updated to match a default UL beam (spatial relation).

By beam management based on DCI (DCI-level beam indication), a common beam/unified TCI state may be indicated from the same TCI pool for both UL and DL (joint common TCI pool, joint TCI pool, set). X (>1) TCI states may be activated by a MAC CE. UL/DL DCI may select one from the X active TCI states. The selected TCI state may be applied to both UL and DL channels/RSs.

The TCI pool (set) may include a plurality of TCI states configured by an RRC parameter or may include a plurality of TCI states activated by a MAC CE (active TCI states, active TCI pool, set) among a plurality of TCI states configured by an RRC parameter. Each TCI state may be a QCL type A/D RS. As a QCL type A/D RS, an SSB, a CSI-RS, or an SRS may be configured.

The number of TCI states corresponding to each of one or more TRPs may be defined. For example, the number N (≥1) of TCI states (UL TCI states) applied to a UL channel/RS and the number M (≥1) of TCI states (DL TCI states) applied to a DL channel/RS may be defined. At least one of N and M may be notified/configured/indicated to the UE by higher layer signaling/physical layer signaling.

In the present disclosure, when it is described that N=M=X (X is any integer), this may mean that X TCI states (corresponding to X TRPs) common to UL and DL (joint TCI states) are notified/configured/indicated to the UE. When it is described that N=X (X is any integer) and M=Y (Y is any integer, Y=X may hold), this may mean that X UL TCI states (corresponding to X TRPs) and Y DL TCI states (corresponding to Y TRPs) (in other words, separate TCI states) are notified/configured/indicated separately to the UE.

For example, when it is described that N=M=1, this may mean that one TCI state common to UL and DL for a single TRP is notified/configured/indicated to the UE (joint TCI state for a single TRP).

For example, when it is described that N=1 and M=1, this may mean that one UL TCI state and one DL TCI state for a single TRP are notified/configured/indicated separately to the UE (separate TCI states for a single TRP).

For example, when it is described that N=M=2, this may mean that a plurality of (two) TCI states common to UL and DL for a plurality of (two) TRPs are notified/configured/indicated to the UE (joint TCI states for a plurality of TRPs).

For example, when it is described that N=2 and M=2, this may mean that a plurality of (two) UL TCI states and a plurality of (two) DL TCI states for a plurality of (two) TRPs are notified/configured/indicated to the UE (separate TCI states for a plurality of TRPs).

Note that, in the above example, cases where the values N and M are each one or two have been described. However, the values N and M may each be three or more, or N and M may be different from each other.

Figure 2A:
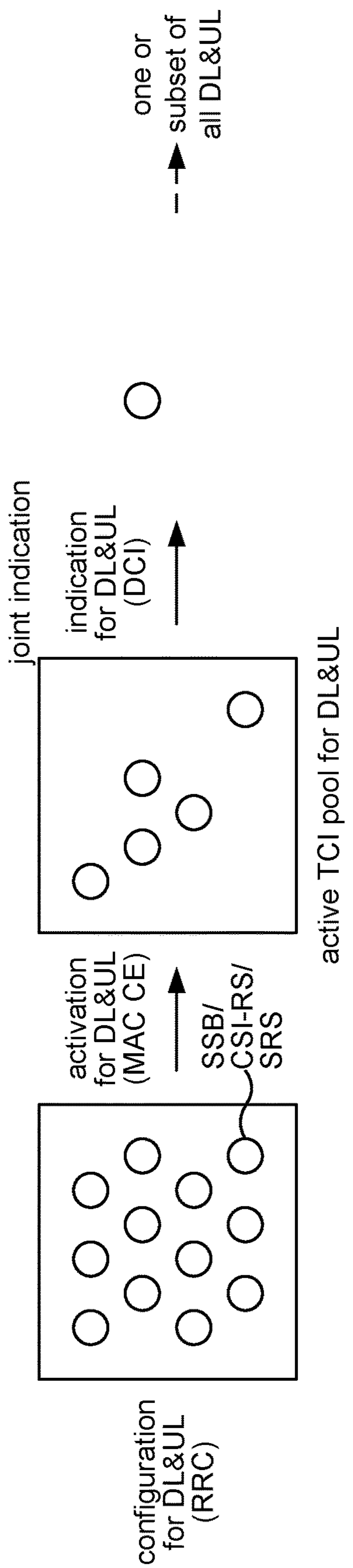
FIGS. 2A and 2B are each a diagram to show an example of a common beam.

In the example in FIG. 2A, an RRC parameter (information element) configures a plurality of TCI states for both DL and UL. A MAC CE may activate a plurality of TCI states among a plurality of configured TCI states. DCI may indicate one of the plurality of activated TCI states. DCI may be UL/DL DCI. The indicated TCI state may be applied to at least one (or all) of UL/DL channels/RSs. One piece of DCI may indicate both UL TCI and DL TCI.

In the example in FIG. 2A, one point may correspond to one TCI state applied to both UL and DL or may correspond to two respective TCI states applied to UL and DL.

At least one of a plurality of TCI states configured by an RRC parameter and a plurality of TCI states activated by a MAC CE may be referred to as a TCI pool (common TCI pool, joint TCI pool, TCI state pool). A plurality of TCI states activated by a MAC CE may be referred to as an active TCI pool (active common TCI pool).

Note that, in the present disclosure, a higher layer parameter (RRC parameter) for configuring a plurality of TCI states may be referred to as configuration information for configuring a plurality of TCI states or simply as "configuration information." In the present disclosure, one of a plurality of TCI states being indicated by using DCI may be receiving indication information indicating one of a plurality of TCI states included in DCI or may simply be receiving "indication information."

Figure 2B:
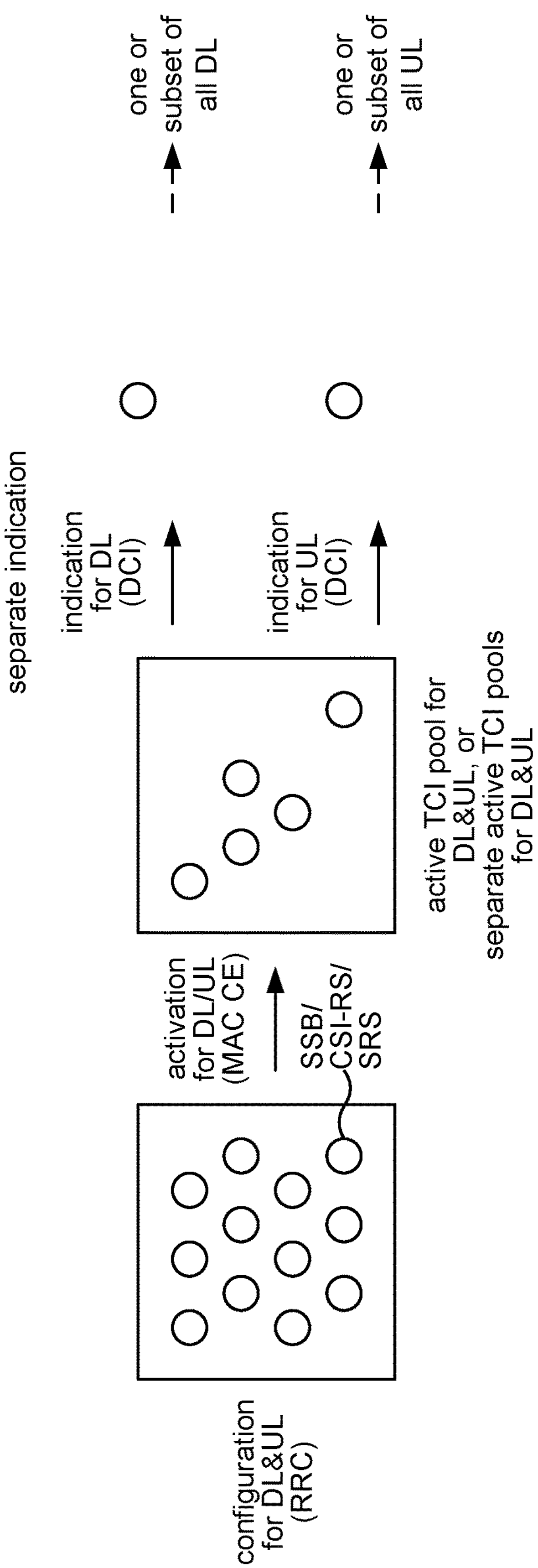

In the example in FIG. 2B, an RRC parameter configures a plurality of TCI states for both DL and UL (joint common TCI pool). A MAC CE may activate a plurality of TCI states (active TCI pool) among a plurality of configured TCI states. (Different, separate) respective active TCI pools for UL and DL may be configured/activated.

DL DCI or a new DCI format may select (indicate) one or more (for example, one) TCI states. The selected TCI state may be applied to one or more (or all) DL channels/RSs. The DL channel(s) may be a PDCCH/PDSCH/CSI-RS(s). The UE may determine the TCI state of each DL channel/RS by using Rel-16 TCI state operation (TCI framework). UL DCI or a new DCI format may select (indicate) one or more (for example, one) TCI states. The selected TCI state may be applied to one or more (or all) UL channels/RSs. The UL channel(s) may be a PUSCH/SRS/PUCCH(s). Thus, different pieces of DCI may separately indicate UL TCI and DL DCI.

Existing DCI format 1_1/1_2 may be used for indication of a common TCI state.

A common TCI framework may have separate TCI states for DL and UL.

(Unified TCI framework in Carrier Aggregation (CA))

In NR of Rel. 17 or later versions, it is studied to introduce a unified TCI state framework in CA. It is expected that a common TCI state indicated for the UE is common to CCs (cells) (QCL type D at least among CCs). This is because simultaneous reception of DL channels/RSs of different QCL types D and simultaneous transmission of UL channels/RSs of different spatial relations are not supported in existing specifications (Rel. 15/16) except for a case of transmission/reception or the like using a plurality of TRPs.

It is studied to update/activate a common TCI state ID for providing common QCL information/common UL transmission spatial filter over a set of a plurality of configured CCs in the unified TCI framework.

As a TCI state pool for CA, options 1 and 2 below are studied.

{Option 1}

A single TCI state pool configured by RRC for a set of a plurality of configured CCs (cells)/BWPs may be shared (configured). For example, a cell group TCI state may be defined, or a TCI state pool for PDSCH in a reference cell may be reused. No CC (cell) ID for QCL type A RS may be present in the TCI states, and a CC (cell) ID for QCL type A RS may be determined according to a target CC (cell) of the TCI states.

In option 1, a common TCI state pool is configured for each pf a plurality of CCs/BWPs. Hence, when one common TCI state is indicated by a MAC CE/DCI, the indicated common TCI state may be applied to all the CCs/BWPs (all the CCs/BWPs included in a CC/BWP list configured in advance).

{Option 2}

For each CC, a TCI state pool may be configured by RRC.

In option 2, similarly to Rel. 16, when a CC/BWP list for simultaneous beam update application is configured in advance by RRC and a beam is updated by a MAC CE/DCI in any of CCs/BWPs included in the CC/BWP list, the update may be applied to all the CCs/BWPs.

In option 1, a common TCI state pool is configured for (shared by) a plurality of CCs by RRC, a TCI state in the common TCI state pool is indicated by a common TCI state ID, and one RS determined based on the TCI state is used to indicate QCL type D for the set of/the configured plurality of CCs (restriction 1).

In option 2, an individual common TCI state pool is configured for each CC by RRC, a TCI state in the common state pool is indicated by a common TCI state ID, and one RS determined based on the TCI state is used to indicate QCL type D for the set of/the configured plurality of CCs (restriction 2).

(Multi-TRP)

For NR, it is studied that one or a plurality of transmission/reception points (TRPs) (multi-TRP (multi TRP (MTRP))) perform DL transmission to a UE by using one or a plurality of panels (multi-panel). It is also studied that the UE performs UL transmission to the one or plurality of TRPs by using one or a plurality of panels.

Note that the plurality of TRPs may correspond to the same cell identifier (ID) or may correspond to different cell IDs. The cell ID may be a physical cell ID or a virtual cell ID.

The multi-TRP (for example, TRPs #1 and #2) may be connected via ideal/non-ideal backhaul to exchange information, data, and the like. Each TRP of the multi-TRP may transmit a different codeword (Code Word (CW)) and a different layer. As one mode of multi-TRP transmission, non-coherent joint transmission (NCJT) may be employed.

In NCJT, for example, TRP #1 performs modulation mapping on a first codeword, performs layer mapping, and transmits a first PDSCH in layers of a first number (for example, two layers) by using first precoding. TRP #2 performs modulation mapping on a second codeword, performs layer mapping, and transmits a second PDSCH in layers of a second number (for example, two layers) by using second precoding.

Note that a plurality of PDSCHs (multi-PDSCH) transmitted by NCJT may be defined to partially or entirely overlap in terms of at least one of the time and frequency domains. In other words, the first PDSCH from a first TRP and the second PDSCH from a second TRP may overlap in terms of at least one of the time and frequency resources.

The first PDSCH and the second PDSCH may be assumed not to be in a quasi-co-location (QCL) relationship (not to be quasi-co-located). Reception of the multi-PDSCH may be interpreted as simultaneous reception of PDSCHs of a QCL type other than a certain QCL type (for example, QCL type D).

A plurality of PDSCHs (which may be referred to as multi-PDSCH (multiple PDSCHs)) from the multi-TRP may be scheduled by using one piece of DCI (single DCI, single PDCCH) (single master mode, multi-TRP based on single DCI (single-DCI based multi-TRP)). The plurality of PDSCHs from the multi-TRP may be separately scheduled by using a plurality of pieces of DCI (multi-DCI, multi-PDCCH (multiple PDCCHs)) (multi-master mode, multi-TRP based on multi-DCI (multi-DCI based multi-TRP)).

For Ultra-Reliable and Low Latency Communications (URLLC) for multi-TRP, it is studied to support PDSCH (transport block (TB) or codeword (CW)) repetition over multi-TRP. It is studied to support a scheme of repetition over multi-TRP in the frequency domain, the layer (space) domain, or the time domain (URLLC schemes, reliability enhancement schemes, for example, schemes 1a, 2a, 2b, 3, and 4). In scheme 1a, multi-PDSCH from multi-TRP is space division multiplexed (SDMed). In schemes 2a and 2b, PDSCHs from multi-TRP are frequency division multiplexed (FDMed). In scheme 2a, a redundancy version (RV) is the same for the multi-TRP. In scheme 2b, an RV may be the same or may be different for the multi-TRP. In schemes 3 and 4, multi-PDSCH from multi-TRP is time division multiplexed (TDMed). In scheme 3, multi-PDSCH from multi-TRP is transmitted in one slot. In scheme 4, multi-PDSCH from multi-TRP is transmitted in different slots.

According to such a multi-TRP scenario, more flexible transmission control using a channel with high quality is possible.

To support intra-cell (with the same cell ID) and inter-cell (with different cell IDs) multi-TRP transmission based on a plurality of PDCCHs, one control resource set (CORESET) in PDCCH configuration information (PDCCH-Config) may correspond to one TRP in RRC configuration information for linking a plurality of pairs of a PDCCH and a PDSCH with a plurality of TRPs.

When at least one of conditions 1 and 2 below is satisfied, the UE may determine that it is multi-TRP based on multi-DCI. In this case, a TRP may be interpreted as a CORESET pol index.

{Condition 1}

One CORESET pool index is configured.

{Condition 2}

Two different values (for example 0 and 1) of a CORESET pool index are configured.

When the following condition is satisfied, the UE may determine that it is multi-TRP based on single DCI. In this case, two TRPs may be interpreted as two TCI states indicated by a MAC CE/DCI.

{Condition}

To indicate one or two TCI states for one codepoint of a TCI field in DCI, an “enhanced TCI states activation/deactivation for UE-specific PDSCH MAC CE” is used.

DCI for common beam indication may be a UE-specific DCI format (for example, DL DCI format (for example, 1_1, 1_2)), may be a UL DCI format (for example, 0_1, 0_2), or may be a UE-group common DCI format.

(Multi-TRP PDCCH)

For reliability of a multi-TRP PDCCH based on non-single frequency network (SFN), studies 1 to 3 below are studied.

{Study 1} Coding/rate matching is based on one repetition, and the same coding bits are repeated in another repetition.

{Study 2} Repetitions have the same number of control channel elements (CCEs) and the same coding bits and correspond to the same DCI payload.

{Study 3} Two or more PDCCH candidates are explicitly linked to each other. The UE knows the link before decoding.

Options 1-2, 1-3, 2, and 3 below for PDCCH repetition are studied.

{Option 1-2}

Two sets of PDCCH candidates (in a given search space (SS) set) are associated with two respective TCI states of a CORESET. Here, the same CORESET, the same SS set, and PDCCH repetitions in different monitoring occasions are used.

{Option 1-3}

Two sets of PDCCH candidates are associated with two respective SS sets. Both of the SS sets are associated with the CORESET, and each of the SS sets is associated only with one TCI state of the CORESET. Here, the same CORESET and two SS sets are used.

{Option 2}

One SS set is associated with two different CORESETs.

{Option 3}

Two SS sets are associated with two respective CORESETs.

In this way, it is studied that two PDCCH candidates in two SS sets for PDCCH repetition are supported and the two SS sets are explicitly linked to each other.

(SFN PDCCH)

For a PDCCH/CORESET defined in a Rel. 15, one TCI state with no CORESET pool index (CORESETPoolIndex) (which may be referred to as TRP information (TRP Info)) is configured for one CORESET.

For PDCCH/CORESET enhancement defined in Rel. 16, a CORESET pool index is configured for each CORESET in multi-TRP based on multi-DCI.

For Rel. 17 or later versions, enhancements 1 and 2 below related to a PDCCH/CORESET are studied.

In a case where a plurality of antennas (small antennas, transmission/reception points) having the same cell ID form a single frequency network (SFN), two TCI states at maximum can be configured/activated for one CORESET by higher layer signaling (RRC signaling/MAC CE) (enhancement 1). The SFN contributes to at least one of operation and reliability improvement of HSTs (high speed trains).

In PDCCH repetition transmission (which may be referred to simply as "repetition"), two PDCCH candidates in two search space sets are linked, and each of the search space sets is associated with a corresponding CORESET (enhancement 2). The two search space sets may be associated with the same or different CORESETs. For one CORESET, one (one at maximum) TCI state can be configured/activated by higher layer signaling (RRC signaling/MAC CE).

If the two search space sets are associated with different CORESETs having different TCI states, this may mean multi-TRP repetition transmission. If the two search space sets are associated with the same CORESET (CORESETs of the same TCI state), this may mean single-TRP repetition transmission.

(HST)

In LTE, arrangement of an HST (high speed train) in a tunnel is difficult. A large antenna performs transmission to the outside/inside of the tunnel. For example, transmission power of the large antenna is on the order of 1 W to 5 W. For handover, it is important to perform transmission to the outside of the tunnel before the UE enters the tunnel. For example, transmission power of a small antenna is on the order of 250 mW. A plurality of small antennas (transmission/reception points) having the same cell ID and having a distance of 300 m form a single frequency network (SFN). All the small antennas in the SFN transmit identical signals in the same PRB at the same time. It is assumed that a terminal performs transmission/reception with one base station. In actual, a plurality of transmission/reception points transmit identical DL signals. At a high-speed movement, transmission/reception points in units of several kilometers form one cell. Handover is performed in a case of moving from one cell to another. Thus, handover frequency can be reduced.

In NR, to perform communication with a terminal (also referred to as a UE) included in a moving object (HST (high speed train)) such as a train moving at high speed, it is assumed to use a beam transmitted from a transmission point (for example, an RRH). In existing systems (for example, in Rel. 15), it is supported to transmit a unidirectional beam from an RRH to perform communication with a moving object (refer to FIG. 3A).

Figure 3A:
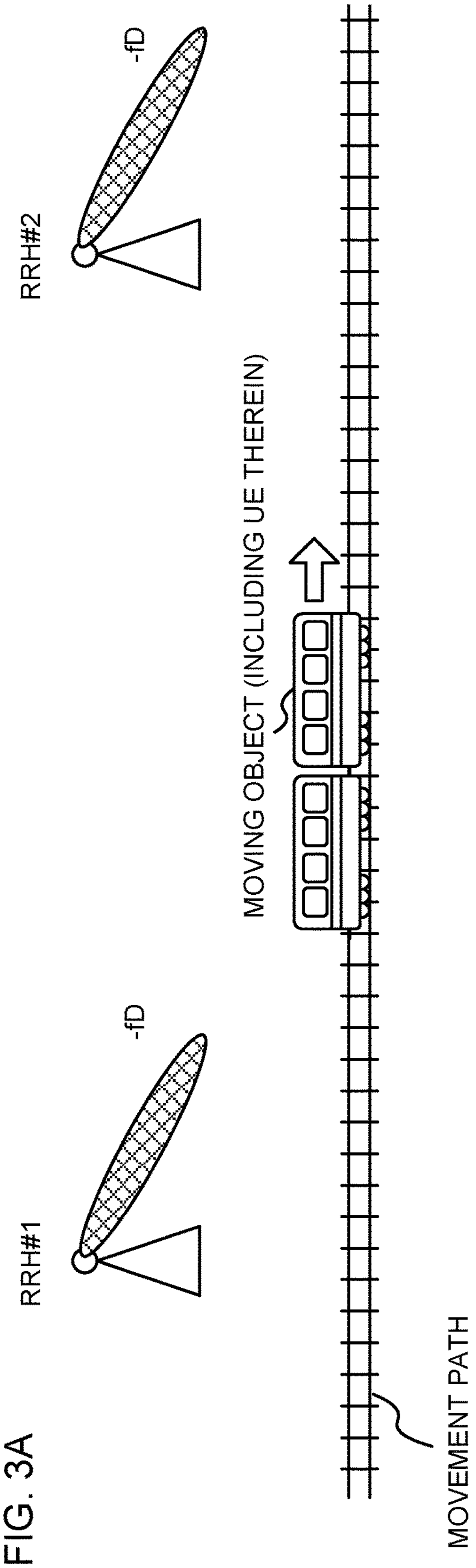
FIGS. 3A and 3B are each a diagram to show an example of communication between a moving object and a transmission point (for example, an RRH).

FIG. 3A shows a case where RRHs are provided along a movement path (or a moving direction, movement direction, traveling path) of the moving object and a beam is formed from each RRH toward a movement direction side of the moving object. Each RRH forming a unidirectional beam may be referred to as a unidirectional RRH (uni-directional RRH). In the example shown in FIG. 3A, the moving object receives negative Doppler shift ($-f_D$) from each RRH.

Note that, although a case where each beam is formed on the movement direction side of the moving object here, this is not restrictive. Each beam may be formed on the side of the opposite direction to the movement direction, or each beam may be formed in any of different directions irrespective of the movement direction of the moving object.

In Rel. 16 or later versions, it is also assumed that a plurality of (for example, two or more) beams are transmitted from each RRH. For example, it is assumed that a beam is formed in both the movement direction of the moving object and the opposite direction to the movement direction (refer to FIG. 3B).

Figure 3B:
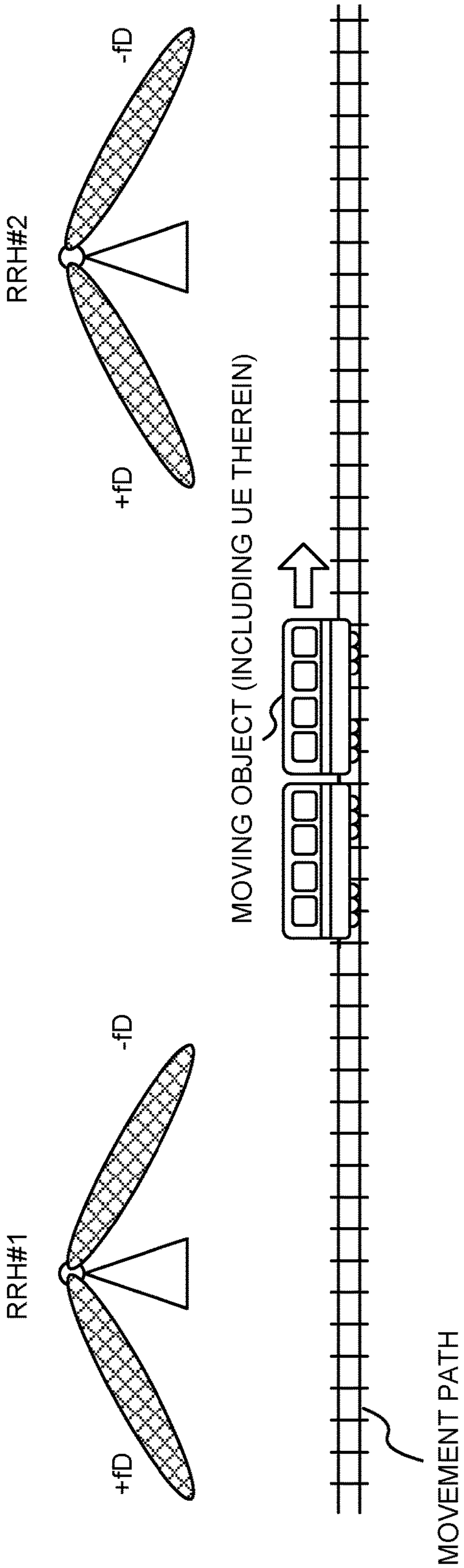

FIG. 3B shows a case where RRHs are provided along a movement path of the moving object and beams are formed from each RRH toward both a movement direction side of the moving object and the opposite direction to the movement direction. Each RRH forming a multi-directional (for example, bidirectional) beams may be referred to as a bidirectional RRH (bi-directional RRH).

In this HST, the UE performs communication similarly to that with a single TRP. In base station implementation, transmission from a plurality of TRPs (same cell ID) can be performed.

In the example in FIG. 3B, when two RRHs (here, RRH #1 and RRH #2) use an SFN, it is switched for the moving object from a signal subjected to negative Doppler shift to a signal subjected to positive Doppler shift to have higher power, at a point located midway between the two RRHs. In this case, the maximum change width of the Doppler shift necessary to be compensated is the change from $-f_D$ to $+f_D$, which is twice as much as that in a case of the unidirectional RRHs.

Note that, in the present disclosure, the positive Doppler shift may be interpreted as information related to positive Doppler shift, positive (forward) direction Doppler shift, and positive (forward) direction Doppler information. The negative Doppler shift may be interpreted as information related to negative Doppler shift, negative (backward) direction Doppler shift, and negative (backward) direction Doppler information.

Here, as schemes for HST, scheme 0 to scheme 2 (HST scheme 0 to HST scheme 2) below are compared.

Figure 4A:
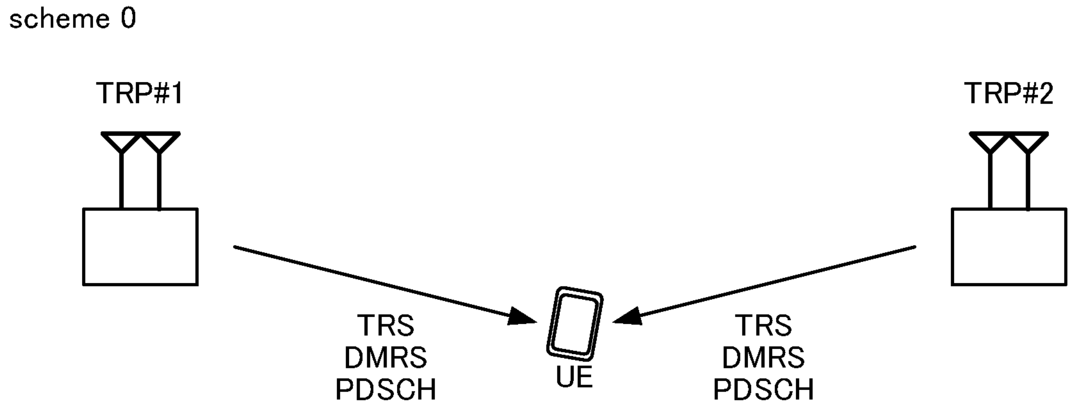
FIGS. 4A to 4C are diagrams to show examples of schemes 0 to 2 related to an SFN.

In scheme 0 in FIG. 4A, a tracking reference signal (TRS), a DMRS, and a PDSCH are commonly transmitted from two TRPs (RRHs) (by using the same time and same frequency resources) (normal SFN, transparent SFN, HST-SFN).

In scheme 0, the UE receives a DL channel/signal in a manner equivalent to a single-TRP, and hence the number of TCI state of PDSCH is one.

Note that, in Rel. 16, an RRC parameter for distinguishing between transmission using a single-TRP and transmission using an SFN is defined. When the UE has reported corresponding UE capability information, the UE may distinguish between reception of a DL channel/signal of a single TRP and reception of a PDSCH assuming an SFN, based on the RRC parameter. Meanwhile, the UE may assume a single-TRP and perform transmission/reception using an SFN.

Figure 4B:
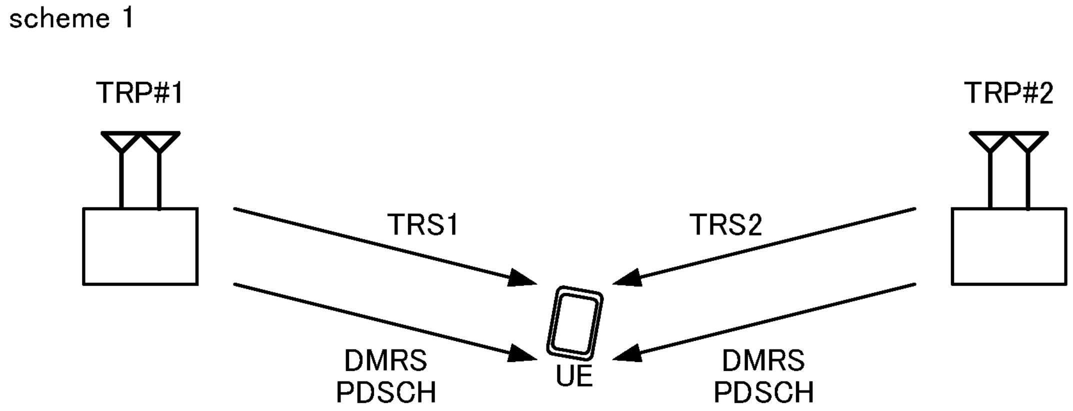

In scheme 1 in FIG. 4B, each TRS is transmitted in a TRP-specific manner (by using a different time/frequency resource for each TRP). In this example, TRS 1 is transmitted from TRP #1, and TRS 2 is transmitted from TRP #2.

In scheme 1, the UE receives a DL channel/signal from each TRP by using the TRS from the TRP, and hence the number of TCI states of PDSCH is two.

Figure 4C:
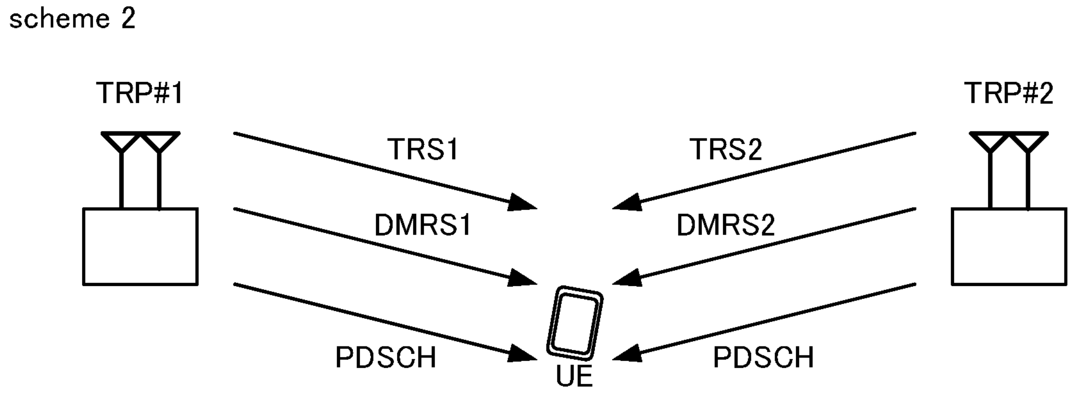

In scheme 2 in FIG. 4C, each TRS and each DMRS are transmitted in a TRP-specific manner. In this example, TRS 1 and DMRS 1 are transmitted from TRP #1, and TRS 2 and DMRS 2 are transmitted from TRP #2. Schemes 1 and 2 can suppress sudden change of Doppler shift and appropriately estimate/compensate for Doppler shift compared with scheme 0. Since the number of DMRSs in scheme 2 is larger than the number of DMRSs in scheme 1, the maximum throughput in scheme 2 results in being lower than that in scheme 1.

In scheme 0, the UE switches between single-TRP and SFN, based on higher layer signaling (RRC information element/MAC CE).

The UE may switch between scheme 1/scheme 2/NW pre-compensation scheme, based on higher layer signaling (RRC information element/MAC CE).

In scheme 1, two respective TRS resources are configured for the movement direction of the HST and the opposite direction to the movement direction.

Figure 5A:
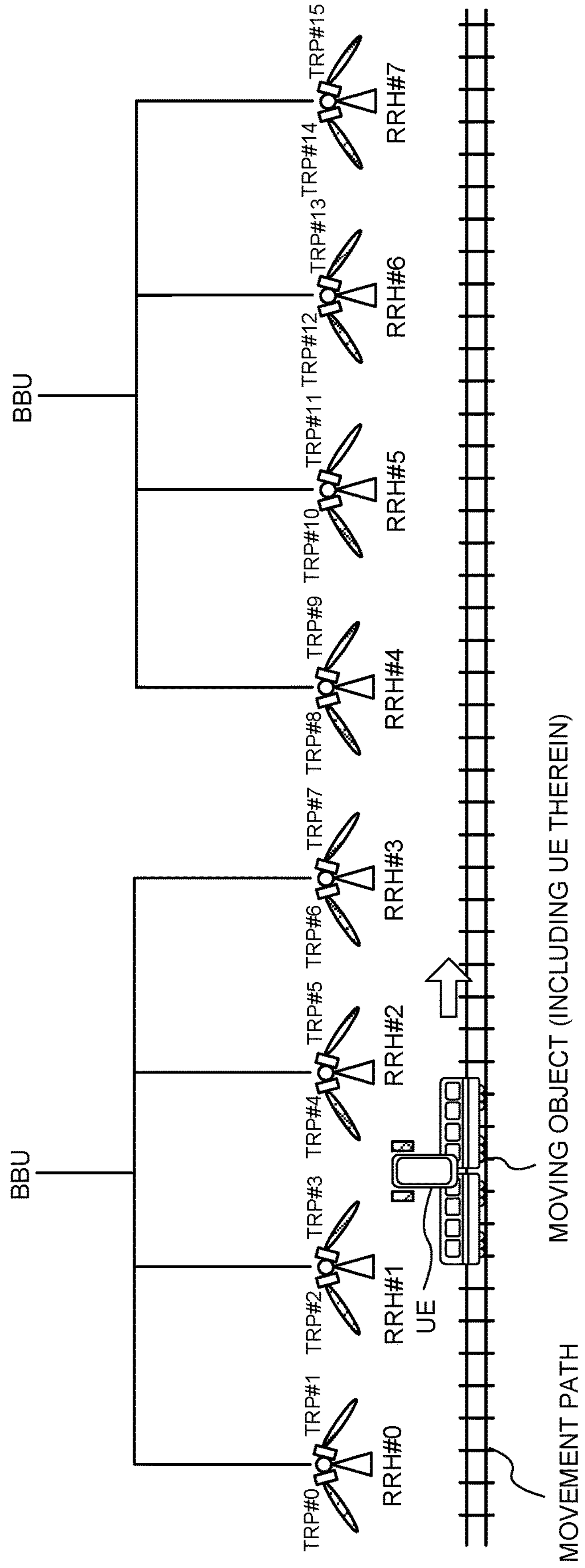
FIGS. 5A and 5B are diagrams to show an example of scheme 1.

In the example in FIG. 5A, each of TRPs transmitting a DL signal in the opposite direction of the HST (TRPs #0, #2, . . . ) transmits a first TRS (TRS arriving from the front of the HST) in the same time and frequency resources (SFN). Each of TRPs transmitting a DL signal in the movement direction of the HST (TRPs #1, #3, . . . ) transmits a second TRS (TRS arriving from the rear of the HST) in the same time and frequency resources (SFN). The first TRS and the second TRS may be transmitted/received by using different frequency resources.

Figure 5B:
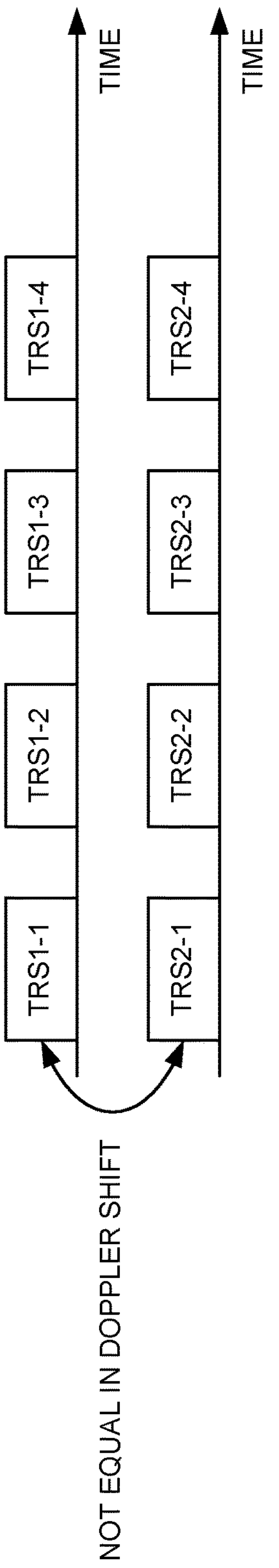

In the example in FIG. 5B, TRSs 1-1 to 1-4 are transmitted as the first TRSs, while TRSs 2-1 to 2-4 are transmitted as the second TRSs.

Consider beam management. 64 beams and 64 time resources are used to transmit the first TRSs, while 64 beams and 64 time resources are used to transmit the second TRSs. The beams of the first TRS and the beams of the second TRSs are considered to be equal (equal in QCL type D RS). By multiplexing the first TRSs and the second TRSs with the same time resources and different frequency resources, this can enhance resource usage efficiency.

Figures 6A, 6B, 6C:
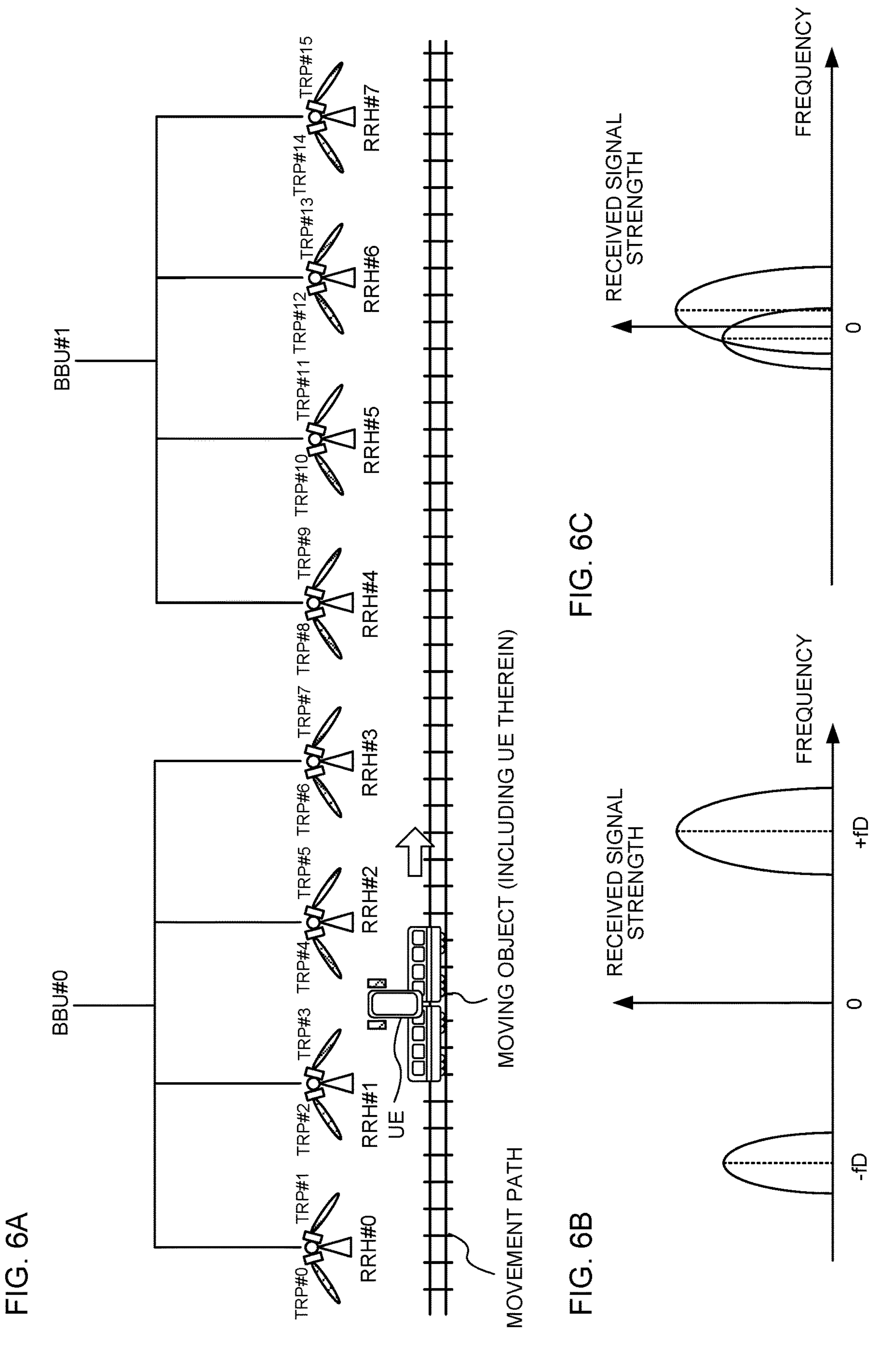
FIGS. 6A to 6C are diagrams to show an example of a Doppler pre-compensation scheme.

In the example in FIG. 6A, RRHs #0 to #7 are mapped along the movement path of the HST. RRHs #0 to #3 are connected to baseband unit (BBU) #0 while RRHs #4 to #7 are connected to BBU #1. Each of the RRHs is a bidirectional RRH and forms beams in both the movement direction in the movement path and the opposite direction to the movement direction by using corresponding transmission/reception points (TRPs).

When the UE receives a signal/channel transmitted from TRP #(2n−1) (n is an integer equal to or greater than 0) (beam in the movement direction of the HST, beam from the rear of the UE), negative Doppler shift (−fD in this example) occurs in each received signal in the example in FIG. 6B (single-TRP (SFN)/scheme 1). When the UE receives a signal/channel transmitted from TRP #2n (n is an integer equal to or greater than 0) (beam in the opposite direction to the movement direction of the HST, beam from the front of the UE), positive Doppler shift (+fD in this example) occurs.

For Rel. 17 or later versions, it is studied that a base station performs pre (preliminary)-Doppler compensation scheme (Doppler pre-Compensation scheme, network (NW) pre-compensation scheme (HST NW pre-compensation scheme), TRP pre-compensation scheme, TRP-based pre-compensation scheme) in transmission of a downlink (DL) signal/channel to a UE in an HST from a TRP. The TRP performs Doppler compensation in advance at the time of transmission of a DL signal/channel to the UE, which can reduce influence of Doppler shift at the time of reception of the DL signal/channel in the UE. In the present disclosure, Doppler pre-compensation scheme may be a combination of scheme 1 and pre-Doppler-shift compensation by a base station.

In the Doppler pre-compensation scheme, a TRP that forms a beam toward the movement direction in the movement path and a TRP that forms a beam toward the opposite direction to the movement direction in the movement path perform Doppler compensation to thereafter transmit DL signals/channels to the UE in the HST. In this example, TRP #(2n−1) performs positive Doppler compensation while TRP #2n performs negative Doppler compensation, to reduce influence of Doppler shift at the time of reception of signals/channels in the UE (FIG. 6C).

Note that the UE receives a DL channel/signal from each TRP by using the TRS from the TRP in the state in FIG. 6C, and hence the number of TCI states of PDSCH may be two.

Further, for Rel. 17 or later versions, it is studied to dynamically switch single-TRP and SFN by using a TCI field (TCI state field). For example, by using an RRC information element/MAC CE (for example, Enhanced TCI States Activation/Deactivation for UE-specific PDSCH MAC CE)/DCI (TCI field), one or two TCI states are configured/indicated by each TCI codepoint (codepoint of the TCI field, DCI codepoint). When one TCI state is configured/indicated, the UE may determine to receive a PDSCH of a single-TRP. When two TCI states are configured/indicated, the UE may determine to receive PDSCHs of SFN using multi-TRP.

For a TRP pre-compensation scheme, it is studied that two TCI states from two TRPs (for example, a TRP located in the movement direction of the UE and a TRP located in the opposite direction to the movement direction of the UE) are indicated to the UE.

It is considered to apply TRP pre-compensation to a PDSCH transmitted from each TRP without applying TRP pre-compensation to a TRS transmitted from each TRP in this situation.

In this case, the TCI state indicates the QCL relationship between a TRS and a DMRS (for PDSCH/PDCCH), and hence at least part of QCL parameters is different between the TRS and the DMRS.

In TRP-based pre-compensation scheme, when one DMRS port is associated with two TCI states, variation (Variant) A and variation B below may be supported as QCL type/QCL assumption:

- variation A: a certain TCI state is associated with {average delay, delay spread}, and another TCI state is associated with {average delay, delay spread, Doppler shift, Doppler spread} (for example, QCL type A) and
- variation B: a certain TCI state is associated with {average delay, delay spread}, and another TCI state is associated with {Doppler shift, Doppler spread} (for example, QCL type B).

The UE may determine that the TCI state corresponding to the TRP in the movement direction of the UE and the TCI state corresponding to the TRP in the opposite direction to the movement direction of the UE are associated with a first TCI state and a second TCI state, respectively. The first TCI state and the second TCI state may be interchangeably interpreted.

The first TCI state and the second TCI state may each be any of two (active) TCI states configured for the UE.

Figure 7:
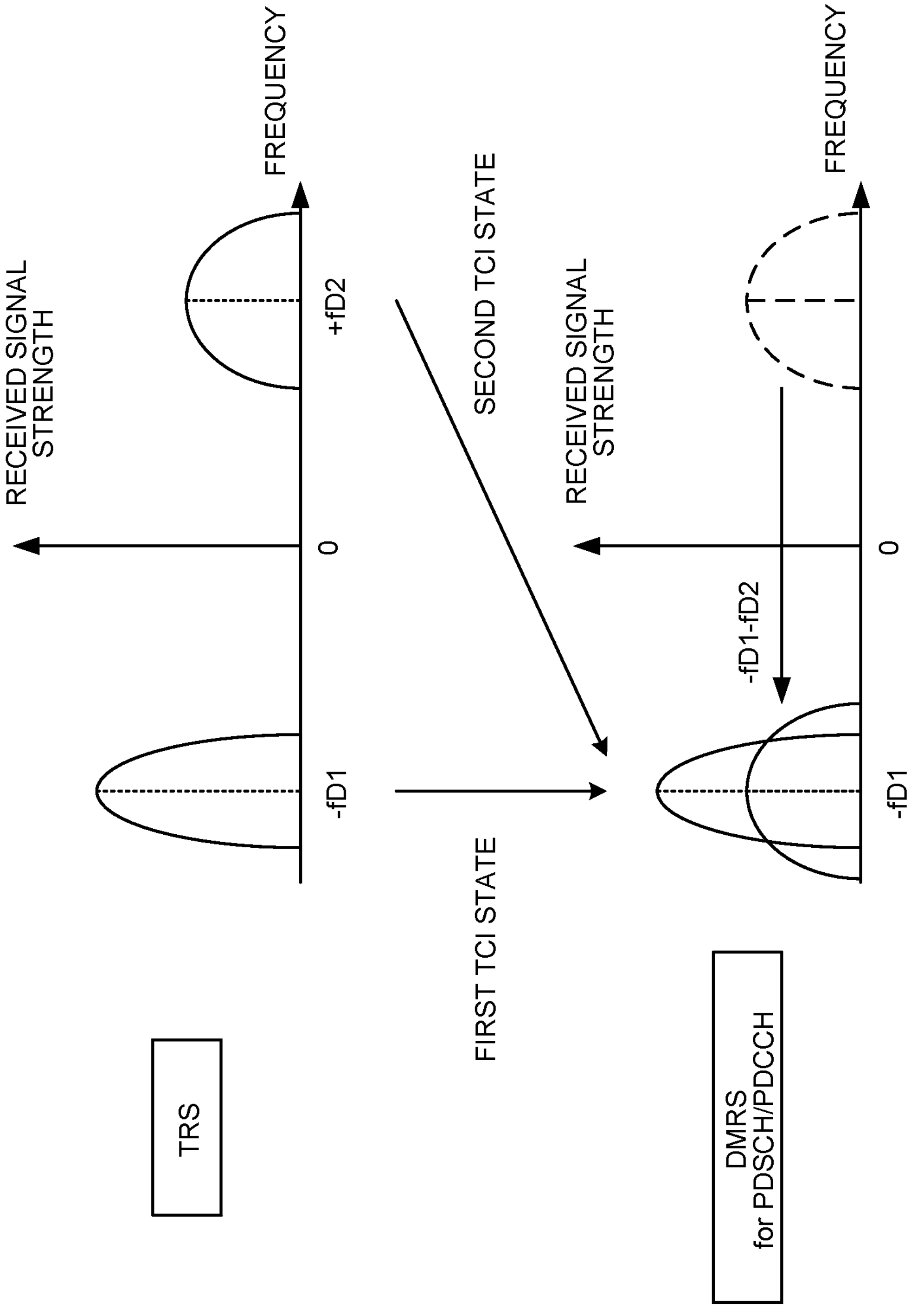
FIG. 7 is a diagram to show an example of Doppler pre-compensation on a DL signal.

FIG. 7 is a diagram to show an example of Doppler pre-compensation on a DL signal. In FIG. 7, negative Doppler shift ($-f_{D1}$ in the example in the drawing) occurs in a DL signal corresponding to a TRP in the opposite direction to the movement direction of the UE (DL signal from the rear of the UE) while positive Doppler shift ($+f_{D2}$ in the example in the drawing) occurs in a DL signal corresponding to a TRP in the movement direction of the UE (DL signal from the front of the UE). In FIG. 7, the TRS/DMRS corresponding to the TRP in the opposite direction to the movement direction of the UE corresponds to the first TCI state while the TRS/DMRS corresponding to the TRP in the movement direction of the UE corresponds to the second TCI state.

The example shown in FIG. 7 shows a TRS from each TRP. In the example shown in FIG. 7, Doppler compensation is not performed on the TRSs.

The example shown in FIG. 7 shows a DMRS for PDSCH/PDCCH from each TRP. In the example shown in FIG. 7, Doppler compensation ($-f_{D1}$-$f_{D2}$) is performed on the DMRS corresponding to the second TCI state among the DMRSs for PDSCH/PDCCH.

In the example shown in FIG. 7, in a case of variation A above, the UE may ignore a specific QCL parameter (for example, Doppler shift/Doppler spread) of the second TCI state for DMRS. This is because Doppler compensation is performed on each DMRS corresponding to the second TCI state.

Note that, although the example shown in FIG. 7 shows an example in which Doppler compensation is performed in the negative direction, Doppler compensation may be performed in the positive direction. The direction of Doppler compensation may be based on the first TCI state and the second TCI state configured/indicated.

As described above, for Rel. 17 or later versions, it is studied that the UE is indicated with a TCI codepoint corresponding to two TCI states in an active TCI state list and drops (ignores) a specific QCL parameter of the second TCI state corresponding to the TCI codepoint. The indication of the TCI codepoint may mean explicit indication of the TCI states performed based on DCI.

FIG. 8 is a diagram to show an example of an active TCI state list. For the UE, such an active TCI state list as that shown in FIG. 8 is configured. Next, for the UE, a TCI codepoint is indicated by using DCI (in the example in FIG. 8, TCI codepoint="110"). In this case, the UE may drop (ignore) the specific QCL parameter of the second TCI state (in the example in FIG. 8, TCI state #9) corresponding to the TCI codepoint.

(Analysis)

In most cases, a default beam (TCI state/spatial relation)/default PL-RS in an SFN-PDCCH is derived from the TCI state of the PDCCH.

For an SFN-PDCCH of a CORESET with two active TCI states, it is not sufficiently studied how to control operation related to a default beam (TCI state/spatial relation)/default PL-RS when a TCI state is derived from the CORESET with the two active TCI states.

Note that, for the SFN-PDCCH, both schemes 1/1a for HST and URLLC may be included. For the SFN-PDCCH, Doppler pre-compensation may be applied only to an HST.

For Rel. 17 or later versions, it is studied that, when an enable two default TCI state information element (enableTwoDefaultTCIStates) is configured and the scheduling offset between DCI and a PDSCH is smaller than a threshold value (timeDurationForQCL), a default TCI state for PDSCH uses scheme 1a above related to a PDSCH defined in Rel. 16 or previous versions.

For Rel. 17 or later versions, it is studied that, when a PDSCH is scheduled by DCI not including a TCI field (for example, DCI format 1_0/1_1/1_2) and the scheduling offset between the DCI and the PDSCH is equal to or larger than the threshold value (timeDurationForQCL), the default TCI state for PDSCH uses QCL of a scheduling CORESET as in Rel. 15. It is studied that, in a case where two TCI states are configured for the scheduling CORESET, both of the TCI states are used as default TCI states. It is studied to use one TCI state in other cases.

For Rel. 17 or later versions, it is studied that, when an enable two default TCI state information element (enableTwoDefaultTCIStates) is not configured and the scheduling offset between DCI and a PDSCH is smaller than a threshold value (timeDurationForQCL), a default TCI state for A-CSI-RS is one TCI state corresponding to the lowest CORESET ID among two TCI states in a case where no other DL signal is present in the same symbol. It is studied to follow specifications defined in Rel. 15/16 or previous versions, in other cases.

For Rel. 17 or later versions, it is studied that, when an enable two default TCI state information element (enableTwoDefaultTCIStates) is configured, one TCI state corresponding to the lowest CORESET ID is selected as a default beam (TCI state/spatial relation)/default PL-RS for a default spatial relation/default PL-RS for UL transmission (PUSCH/PUCCH/SRS) for single-TRP.

For Rel. 17 or later versions, it is studied to schedule an SFN-PDSCH (scheme 1/TRP pre-compensation scheme) by using DCI not including a TCI field (for example, DCI format 1_0) in frequency range (FR) 2.

In these studies, a method of applying a TCI state/default TCI state is not sufficiently studied in some cases.

Unless these studies are sufficient, it is not possible to appropriately control operation of a TCI state/default TCI state for DL reception, and degradation in communication quality, throughput reduction, and the like may occur.

Thus, the inventors of the present invention came up with the idea of a method of appropriately controlling operation related to a TCI state/default TCI state.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, a sequence, a list, a set, a group, a cluster, a subset, and the like may be interchangeably interpreted. In the present disclosure, "support," "control," "controllable," "operate," and "operable" may be interchangeably interpreted.

In the present disclosure, configuration (configure), activation (activate), update, indication (indicate), enabling (enable), specification (specify), and selection (select) may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), an RRC message, and a configuration may be interchangeably interpreted.

The MAC signaling may use, for example, a MAC control element (MAC CE), a MAC Protocol Data Unit (PDU), or the like. In the present disclosure, a MAC CE, an update command, and an activation/deactivation command may be interchangeably interpreted.

The broadcast information may be, for example, a master information block (MIB), a system information block (SIB), minimum system information (Remaining Minimum System Information (RMSI), SIB1), other system information (OSI), or the like.

In the present disclosure, a beam, a spatial domain filter, spatial setting, a TCI state, a UL TCI state, a unified TCI state, a default TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS having QCL type X, a DL-RS source, an SSB, a CSI-RS, and an SRS may be interchangeably interpreted.

In the present disclosure, a panel, a UE panel, a panel group, a beam, a beam group, a precoder, an Uplink (UL) transmission entity, a transmission/reception point (TRP), a base station, spatial relation information (SRI), a spatial relation, an SRS resource indicator (SRI), a control resource set (CORESET), a Physical Downlink Shared Channel (PDSCH), a codeword (CW), a transport block (TB), a reference signal (RS), a base station, an antenna port of a certain signal (for example, a demodulation reference signal (DMRS) port), a DMRS, an antenna port group of a certain signal (for example, a DMRS port group), a group for multiplexing (for example, a code division multiplexing (CDM) group, a reference signal group, a CORESET group, a Physical Uplink Control Channel (PUCCH) group, a PUCCH resource group, a resource (for example, a reference signal resource, an SRS resource), a resource set (for example, a reference signal resource set), a CORESET pool, a CORESET subset, a downlink Transmission Configuration Indication state (TCI state) (DL TCI state), an uplink TCI state (UL TCI state), a unified TCI state, a common TCI state, a default TCI state, quasi-co-location (QCL), QCL assumption, a redundancy version (RV), and a layer (multi-input multi-output (MIMO) layer, transmission layer, spatial layer) may be interchangeably interpreted. A panel Identifier (ID) and a panel may be interchangeably interpreted. In the present disclosure, a TRP ID and a TRP may be interchangeably interpreted.

The panel may be related to at least one of a group index of an SSB/CSI-RS group, a group index of group-based beam report, and a group index of an SSB/CSI-RS group for group-based beam report.

A panel Identifier (ID) and a panel may be interchangeably interpreted. In other words, a TRP ID and a TRP, a CORESET group ID and a CORESET group, and the like may be interchangeably interpreted.

In the present disclosure, a TRP, a transmission point, a panel, a DMRS port group, a CORESET pool, and one of two TCI states associated with one codepoint of a TCI field may be interchangeably interpreted.

In the present disclosure, it may be assumed that a single PDCCH (DCI) is supported when multi-TRP uses ideal backhaul. It may be assumed that multi-PDCCH (DCI) is supported when multi-TRP uses non-ideal backhaul.

Note that the ideal backhaul may be referred to as DMRS port group type 1, reference signal related group type 1, antenna port group type 1, CORESET pool type 1, and the like. The non-ideal backhaul may be referred to as DMRS port group type 2, reference signal related group type 2, antenna port group type 2, CORESET pool type 2, and the like. The names are not limited to these.

In the present disclosure, a single TRP, a single-TRP system, single-TRP transmission, and a single PDSCH may be interchangeably interpreted. In the present disclosure, multi-TRP, multi-TRP system, multi-TRP transmission, and multi-PDSCH may be interchangeably interpreted. In the present disclosure, single DCI, a single PDCCH, multi-TRP based on single DCI, and two TCI states in at least one TCI codepoint being activated may be interchangeably interpreted.

In the present disclosure, a single TRP, a channel using a single TRP, a channel using one TCI state/spatial relation, multi-TRP being not enabled by RRC/DCI, a plurality of TCI states/spatial relations being not enabled by RRC/DCI, and one CORESET pool index (CORESETPoolIndex) value being not configured for any CORESET and any codepoint of a TCI field being not mapped to two TCI states may be interchangeably interpreted.

In the present disclosure, multi-TRP, a channel using multi-TRP, a channel using a plurality of TCI states/spatial relations, multi-TRP being enabled by RRC/DCI, a plurality of TCI states/spatial relations being enabled by RRC/DCI, and at least one of multi-TRP based on single DCI and multi-TRP based on multi-DCI may be interchangeably interpreted. In the present disclosure, multi-TRP based on multi-DCI and one CORESET pool index (CORESETPoolIndex) value being configured for a CORESET may be interchangeably interpreted. In the present disclosure, multi-TRP based on single DCI and at least one codepoint in a TCI field being mapped to two TCI states may be interchangeably interpreted.

In the present disclosure, TRP #1 (first TRP) may correspond to CORESET pool index=0 or correspond to the first TCI state of two TCI states corresponding to one codepoint of a TCI field. TRP #2 (second TRP) TRP #1 (first TRP) may correspond to CORESET pool index=1 or correspond to the second TCI state of two TCI states corresponding to one codepoint of a TCI field.

In the present disclosure, single DCI (sDCI), a single PDCCH, a multi-TRP system based on single DCI, sDCI-based MTRP, and two TCI states in at least one TCI codepoint being activated may be interchangeably interpreted.

In the present disclosure, multi-DCI (mDCI), multi-PDCCH, a multi-TRP system based on multi-DCI, mDCI-based MTRP, and two CORESET pool indices or CORESET pool index=1 (or a value equal to one or greater) being configured may be interchangeably interpreted.

QCL in the present disclosure may be interchangeably interpreted as any QCL type (for example, QCL type A/B/C/D) and vice versa.

In the present disclosure, "TCI state A is of the same QCL type A/D as that of TCI state B," "TCI state A and TCI state B are the same," "TCI state A is QCL type A/D with TCI state B," "TCI state A is in the relationship of QCL type A/D with TCI state B," and the like may be interchangeably interpreted.

In the present disclosure, a CSI-RS, an NZP-CSI-RS, a periodic (P)-CSI-RS, a P-TRS, a semi-persistent (SP)-CSI-RS, an aperiodic (A)-CSI-RS, a TRS, a CSI-RS for tracking, a CSI-RS including TRS information (higher layer parameter trs-Info), an NZP CSI-RS resource in an NZP CSI-RS resource set including TRS information, an NZP-CSI-RS resource in an NZP-CSI-RS resource set including a plurality of NZP-CSI-RS resources with the same antenna port, and a TRS resource may be interchangeably interpreted. In the present disclosure, a CSI-RS resource, a CSI-RS resource set, a CSI-RS resource group, and an information element (IE) may be interchangeably interpreted.

In the present disclosure, a codepoint with a DCI field of 'Transmission Configuration Indication,' a TCI codepoint, a DCI codepoint, and a codepoint of a TCI field may be interchangeably interpreted.

In the present disclosure, DCI not including a TCI field may mean DCI format 1_0. In the present disclosure, DCI not including a TCI field may mean DCI format 1_1/1_2 in a case where a specific higher layer parameter (for example, a parameter indicating presence of TCI (for example, tci-PresentInDCI)) is configured/enabled.

In the present disclosure, a single-TRP and an SFN may be interchangeably interpreted. In the present disclosure, an HST, an HST scheme, a scheme for high-speed moving, scheme 1, scheme 2, an NW pre-compensation scheme, HST scheme 1, HST scheme 2, and an HST NW pre-compensation scheme may be interchangeably interpreted.

In the present disclosure, a PDSCH/PDCCH using a single TRP may be interpreted as a PDSCH/PDCCH based on a single TRP and a single-TRP PDSCH/PDCCH. In the present disclosure, a PDSCH/PDCCH using an SFN may be interpreted as a PDSCH/PDCCH using an SFN in multi, a PDSCH/PDCCH based on an SFN, and an SFN PDSCH/PDCCH.

In the present disclosure, receiving a DL signal (PDSCH/PDCCH) by using an SFN may mean reception by using the same time/frequency resource and/or receiving the same data (PDSCH)/control information (PDCCH) from a plurality of transmission/reception points. Receiving a DL signal by using an SFN may mean reception by using the same time/frequency resource and/or receiving the same data/control information by using a plurality of TCI states/spatial domain filters/beams/QCLs.

In the present disclosure, an HST-SFN scheme, an SFN scheme in Rel. 17 or later versions, a new SFN scheme, a new HST-SFN scheme, an HST-SFN scenario in Rel. 17 or later versions, an HST-SFN scheme for an HST-SFN scenario, an SFN scheme for an HST-SFN scenario, scheme 1, Doppler pre-compensation scheme, and at least one of scheme 1 (HST scheme) and Doppler pre-compensation scheme may be interchangeably interpreted. In the present disclosure, a Doppler pre-compensation scheme, a base station pre-compensation scheme, a TRP pre-compensation scheme, a Doppler pre-compensation scheme, an NW pre-compensation scheme, an HST NW pre-compensation scheme, a TRP pre-compensation scheme, and a TRP-based pre-compensation scheme may be interchangeably interpreted. In the present disclosure, a pre-compensation scheme, a reduction scheme, an improvement scheme, and a compensation scheme may be interchangeably interpreted.

In the present disclosure, PDCCHs/search spaces (SSs)/CORESETs having a linkage, linked PDCCHs/SSs/CORESETs, and a pair of PDCCHs/SSs/CORESETs may be interchangeably interpreted. In the present disclosure, a PDCCH/SS/CORESET having no linkage, a not-linked PDCCH/SS/CORESET, and an independent PDCCH/SS/CORESET may be interchangeably interpreted.

In the present disclosure, two linked CORESETs for PDCCH repetition and two CORESETS associated with two respective linked SS sets may be interchangeably interpreted.

In the present disclosure, SFN-PDCCH repetition, PDCCH repetition, two linked PDCCHs, and one piece of DCI being received over the two linked search spaces (SSs)/CORESETs may be interchangeably interpreted.

In the present disclosure, PDCCH repetition, SFN-PDCCH repetition, PDCCH repetition for higher reliability, and two linked PDCCHs may be interchangeably interpreted.

In the present disclosure, a PDCCH reception method, PDCCH repetition, SFN-PDCCH repetition, an HST-SFN, and an HST-SFN scheme may be interchangeably interpreted.

In the present disclosure, a PDSCH reception method, a single-DCI based multi-TRP, and an HST-SFN scheme may be interchangeably interpreted.

In the present disclosure, single-DCI based multi-TRP repetition may be NCJT of enhanced mobile broadband (eMBB) service (low priority, priority 0) or may be repetition of ultra-reliable and low latency communications service, URLLC service (high priority, priority 1).

In the present disclosure, a received DL channel/signal, a DL channel/signal, a DL reception, a received signal, a received channel, and the like may be interchangeably interpreted. In the present disclosure, a UL channel/signal, transmission of a UL channel/signal, and UL transmission may be interchangeably interpreted. In the present disclosure, a signal and a channel may be interchangeably interpreted. In the present disclosure, buffering and buffer may be interchangeably interpreted.

In the present disclosure, a first TCI state may mean at least one of a first-ordered TCI state and a TCI state with a low (or high) TCI state ID. A second TCI state may mean at least one of a second-ordered TCI state and a TCI state with a high (or low) TCI state ID. In the present disclosure, the first TCI state and the second TCI state may be interchangeably interpreted.

In each of the embodiments of the present disclosure, two (default) TCI states are used as main examples for description. However, the number of TCI states is not limited to two, and each embodiment is also appropriately applicable to two or more (default) TCI states.

A TCI state/default TCI state in each of the embodiments of the present disclosure may be interpreted as at least one of a unified TCI state and a default TCI state in a unified TCI state. In other words, each of the embodiments of the present disclosure is appropriately applicable to a case where a unified TCI state framework is applied.

In the present disclosure, two default TCI states and two TCI states being default may be interchangeably interpreted.

In the present disclosure, small, less, short, and low may be interchangeably interpreted. In the present disclosure, ignore, drop, and the like may be interchangeably interpreted.

(Radio Communication Method)

A UE may determine a TCI state/default TCI state to apply to a DL channel/signal (for example, at least one of a PDSCH, a DMRS for PDSCH, and a DMRS for PDCCH), based on a specific condition.

The specific condition may be a condition based on at least one of whether Doppler compensation is applied to a DL signal/channel, a frequency range, a magnitude relation between a scheduling offset and a threshold value, and scheduling DCI.

In the present disclosure, determining a TCI state/default TCI state may mean determining/judging at least one of one or two TCI states/default TCI states and dropping (ignoring) of a QCL parameter of a specific TCI state.

In the following, in each of the embodiments of the present disclosure, description will be given by taking a PDSCH as an example of a DL channel. However, a PDSCH may be appropriately interpreted as a DMRS for PDSCH, a DMRS for PDCCH, a PDCCH, and the like. A DMRS (port) of a PDSCH/PDCCH being QCLed with an RS associated with a TCI state and a TCI state being applied to a PDSCH may be interchangeably interpreted.

First Embodiment

In a first embodiment, for a DL channel/signal (for example, a PDSCH/DMRS for PDSCH/DMRS for PDCCH), at least one of a TRP pre-compensation and scheme 1 may be configured/applied.

The present embodiment may be applied in a specific frequency range (for example, FR2).

In the present disclosure, FR2 may mean a frequency range higher than a specific frequency value. FR1 may mean a frequency range lower than a specific frequency value.

The UE may determine that a default TCI state of a DL signal as a TCI state corresponding to a specific CORESET (CORESET ID).

When an enable two default TCI state information element (enableTwoDefaultTCIStates) is configured and a scheduling offset between DCI and a PDSCH is smaller than a threshold value (timeDurationForQCL), the UE may use scheme 1a above related to a PDSCH defined in Rel. 16 or previous versions, to determine a default TCI state for PDSCH.

When a PDSCH is scheduled by DCI not including a TCI field (for example, DCI format 1_0/1_1/1_2) and the scheduling offset between the DCI and the PDSCH is equal to or larger than the threshold value (timeDurationForQCL), the UE may determine to use the QCL (TCI state) of a scheduling CORESET as in Rel. 15 for the default TCI state for PDSCH.

In a case where two TCI states are configured for the scheduling CORESET, the UE may determine to use both of the TCI states as default TCI states. In other cases, the UE may determine to use one (active) TCI state.

For the PDSCH, the UE may determine the QCL of the PDSCH to be one or two QCL assumptions having the lowest CORESET ID in the latest slot in the same BWP as the active BWP of the serving cell.

When the lowest CORESET ID in the latest slot corresponds to one TCI state, the UE may use the one TCI state for reception of the PDSCH. When the lowest CORESET ID in the latest slot corresponds to two TCI states, the UE may use the two TCI states for reception of the PDSCH.

The QCL assumption of the PDSCH may be both of two QCLs/TCI states of the scheduling CORESET in the same BWP as the active BWP of the serving cell.

In other words, the UE may determine the QCL assumption of the PDSCH to be both of two QCLs/TCI states of the scheduling CORESET in the same BWP as the active BWP of the serving cell.

In this case, non-cross-carrier scheduling may be applied, for example.

With this, an increase in complexity of the UE can be suppressed without necessity of switching/distinguishing buffering operation depending on the presence/absence of a TCI field.

The UE may ignore (drop) at least one QCL parameter from a specific TCI state.

For example, in variation A above, the UE may ignore at least one of Doppler shift and Doppler spread among the QCL parameters of QCL type A of the second TCI state.

For example, in variation B above, the UE may ignore at least one of average delay and delay spread among the QCL parameters of QCL type A of the first TCI state. The UE may ignore at least one of Doppler shift and Doppler spread among the QCL parameters of QCL type A of the second TCI state.

For example, in variation B above, in a case where QCL type B is configured for the first TCI state, the UE may ignore at least one of Doppler shift and Doppler spread among the QCL parameters of QCL type A of the second TCI state.

For the two determined TCI states, the UE need not ignore any QCL parameter. For example, when scheme 1 is applied to a DL channel/signal (for example, PDSCH/DMRS for PDSCH/DMRS for PDCCH), the UE may use all the QCL parameters for the two determined TCI states.

FIG. 9 is a diagram to show an example of determination of a TCI state in the first embodiment. Such an active TCI state list for PDSCH as that shown in FIG. 9 is configured for the UE.

In the example shown in FIG. 9, the UE determines two TCI states (TCI states #4 and #5 in FIG. 9) having the lowest TCI codepoint ("100" in FIG. 9) corresponding to two TCI states, to be default TCI states.

In FIG. 9, for example, the UE may ignore Doppler shift and Doppler spread among the QCL parameters of the second TCI state.

Figure 10:
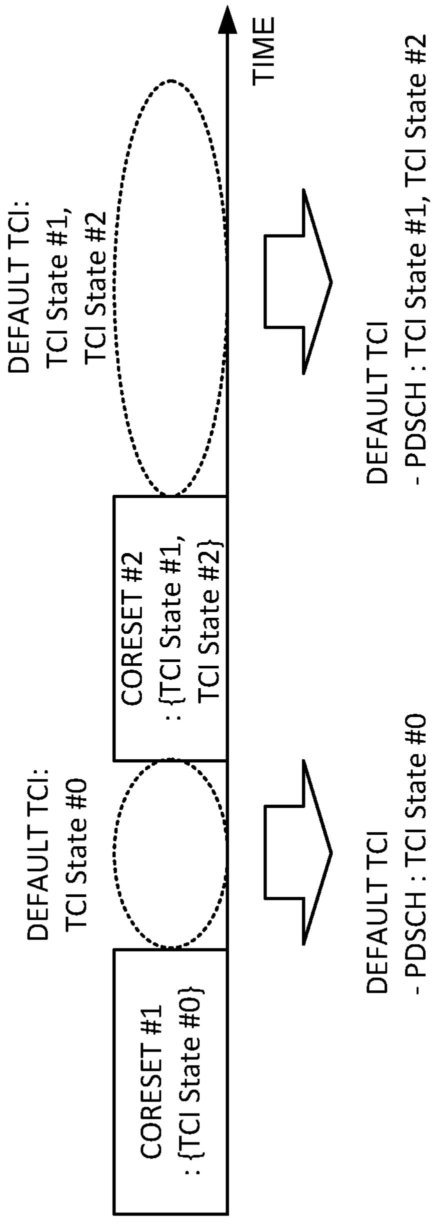
FIG. 10 is a diagram to show another example of the determination of a TCI state in the first embodiment.

FIG. 10 is a diagram to show another example of the determination of a TCI state in the first embodiment. As shown in FIG. 10, the UE determines a default TCI state from the TCI states of the CORESET in the latest slot.

In FIG. 10, for example, the UE may ignore Doppler shift and Doppler spread among the QCL parameters of the second TCI state (for example, TCI state #2) corresponding to CORESET #2.

According to the first embodiment above, even when at least one of a TRP pre-compensation scheme and scheme 1 is applied, it is possible to appropriately control application of a default TCI state and a QCL parameter.

Second Embodiment

In a second embodiment, a PDSCH may be scheduled by using specific DCI.

The specific DCI may be, for example, DCI not including a TCI field (DCI format 1_0/1_1/1_2). The PDSCH may be, for example, an SFN-PDSCH.

The present embodiment may be applied in a specific frequency range (for example, FR1).

The UE may apply the TCI state of a specific CORESET (TCI state corresponding to the specific CORESET ID) to reception of a PDSCH scheduled by using the DCI. The specific CORESET may be, for example, a CORESET related to the DCI (scheduling CORESET).

When a plurality of (two) TCI states correspond to the scheduling CORESET, the UE may apply both of the TCI states/QCL assumptions to the reception of a PDSCH. In other cases, the UE may apply one active TCI state of the scheduling CORESET to the reception of a PDSCH.

UE capability information (UE capability) based on a frequency range may be defined. For example, UE capability information related to FR1 and UE capability information related to FR2 may be defined separately.

For example, the UE capability information related to FR1 may be defined by whether an SFN-PDSCH can be scheduled by using DCI not including a TCI field.

For example, the UE capability information related to FR2 may be defined by at least one of whether an SFN-PDSCH can be scheduled by using DCI not including a TCI field and whether two different TCI states with two QCL type D RSs can be received.

In the present embodiment, TRP pre-compensation may be applied to/configured for a PDSCH. In the present embodiment, when TRP pre-compensation is applied to a PDSCH, the UE may ignore a specific QCL parameter of a specific TCI state as described in the first embodiment above.

In the present embodiment, scheme 1 may be applied to/configured for a PDSCH. When scheme 1 is applied to a PDSCH, the UE may use all the QCL parameters for the two determined TCI states as described in the first embodiment above.

According to the second embodiment above, it is also possible to appropriately determine a TCI state of a PDSCH in FR1.

Third Embodiment

In a third embodiment, a PDSCH may be scheduled by using specific DCI.

The specific DCI may be, for example, DCI not including a TCI field (DCI format 1_0/1_1/1_2).

The third embodiment may be applied to a case where the offset (scheduling offset) from reception of DCI to reception of a PDSCH corresponding to the DCI is smaller than a threshold value (for example, timeDurationForQCL).

The UE may apply the TCI state of a specific CORESET (TCI state corresponding to the specific CORESET ID) to reception of a PDSCH scheduled by using the DCI.

Embodiment 3-1

The UE may apply the TCI state of a CORESET (scheduling CORESET) related to the DCI, to reception of a PDSCH scheduled by using the DCI.

When a plurality of (two) TCI states correspond to the scheduling CORESET, the UE may apply both of the TCI states/QCL assumptions to the reception of a PDSCH. In other cases, the UE may apply one active TCI state of the scheduling CORESET to the reception of a PDSCH.

Embodiment 3-2

The UE may apply one or two TCI states among the TCI states in a TCI state list for PDSCH as a default TCI state(s), to the reception of a PDSCH scheduled by using the DCI.

When an enable two default TCI state information element (enableTwoDefaultTCIStates) is not configured, the UE may apply a QCL assumption/TCI state having the lowest CORESET ID in the latest slot, to the reception of a PDSCH (Embodiment 3-2-1).

When a plurality of (two) TCI states correspond to the lowest CORESET ID in the latest slot, the UE may apply both of the TCI states/QCL assumptions to the reception of a PDSCH. In other cases, the UE may apply one active TCI state of the scheduling CORESET to the reception of a PDSCH.

In Embodiment 3-2-1, the UE may determine to receive a PDSCH of a single-TRP.

When an enable two default TCI state information element (enableTwoDefaultTCIStates) is configured, the UE may apply two TCI states (QCL assumptions) corresponding to the lowest TCI codepoint among the TCI codepoints corresponding to two active TCI states in the TCI state list, to the reception of a PDSCH (Embodiment 3-2-2).

In Embodiment 3-2-2, the UE may determine to receive an SFN-PDSCH.

Embodiment 3-3

The UE may apply one default TCI state, to the reception of a PDSCH scheduled by using the DCI.

The UE may apply the QCL assumption/TCI state (default TCI state) having the lowest CORESET ID in the latest slot, to the reception of the PDSCH.

In Embodiment 3-3, the UE may determine to receive a PDSCH of a single-TRP.

When the scheduling offset is smaller than a threshold value, the UE may assume/expect that a PDSCH (SFN-PDSCH) is not scheduled by using DCI not including a TCI field. The UE may determine whether a PDSCH (SFN-PDSCH) is scheduled by using DCI not including a TCI field, based on UE capability information.

In the present embodiment, TRP pre-compensation may be applied to/configured for a PDSCH. In the present embodiment, when TRP pre-compensation is applied to a PDSCH, the UE may ignore a specific QCL parameter of a specific TCI state as described in the first embodiment above.

In the present embodiment, scheme 1 may be applied to/configured for a PDSCH. When scheme 1 is applied to a PDSCH, the UE may use all the QCL parameters for the two determined TCI states as described in the first embodiment above.

Note that the third embodiment may be applied in a specific frequency range (for example, FR2).

According to the third embodiment above, it is possible to appropriately determine a TCI state of a PDSCH in FR1 as well.

Fourth Embodiment

A higher layer parameter (RRC IE)/UE capability corresponding to at least one function (characteristics, feature) in the plurality of embodiments above may be defined. The UE capability may indicate supporting of this function.

The UE configured with a higher layer parameter corresponding to the function (that enables the function) may perform the function. It may be defined that the "UE not configured with a higher layer parameter corresponding to the function does not perform the function (for example, follows Rel. 15/16)."

The UE that has reported UE capability indicating supporting of the function may perform the function. It may be defined that the "UE that has not reported UE capability indicating supporting of the function does not perform the function (for example, follows Rel. 15/16)."

When the UE reports the UE capability indicating supporting of the function and is configured with a higher layer parameter corresponding to the function, the UE may perform the function. It may be defined that "when the UE does not report UE capability indicating supporting of the function or is not configured with a higher layer parameter corresponding to the function, the UE does not perform the function (for example, follows Rel. 15/16)."

The UE capability may indicate whether the UE supports this function.

The function may be application of a TCI state/default TCI state.

The function may be application of one or two TCI states/default TCI states.

The UE capability may be defined by whether to support a CORESET having two TCI states.

The UE capability may be defined by whether to support an SFN scheme/HST scheme.

The UE capability may be defined by whether to support dynamic switching between an SFN/HST using a TCI field and a single-TRP, for a PDSCH.

The UE capability may be defined by whether to support dynamic switching between an SFN/HST and a single-TRP using the number of active TCI states configured/indicated for each CORESET, for a PDCCH.

The UE capability may be defined by whether to support dropping/ignoring of a specific QCL parameter of a specific TCI state as described in the first to third embodiments above.

The UE capability may be defined by whether to support at least one function described in each embodiment of the present disclosure.

According to the fourth embodiment above, the UE can implement the above functions while maintaining compatibility with an existing specification.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 11:
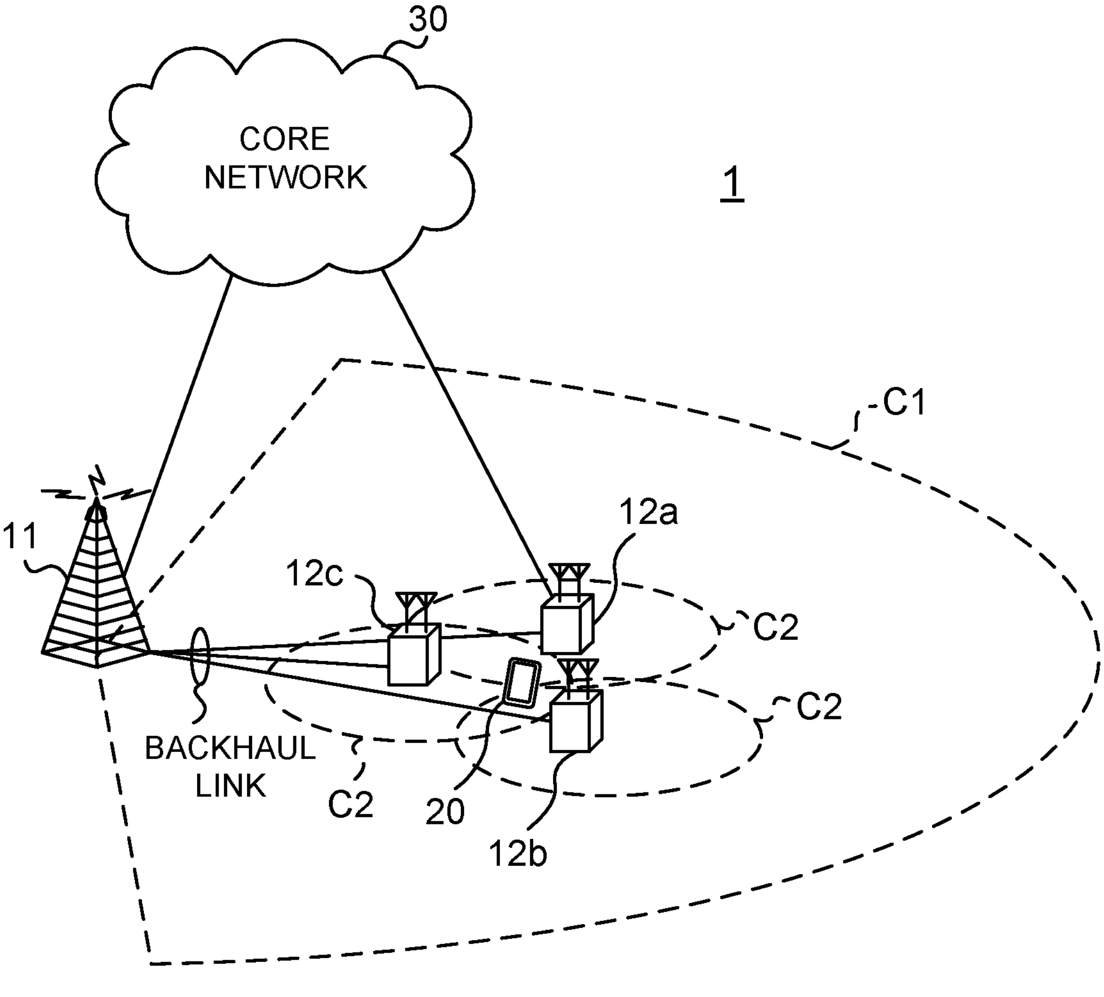
FIG. 11 is a diagram to show an example of a schematic structure of a radio communication system according to one embodiment.

FIG. 11 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 12:
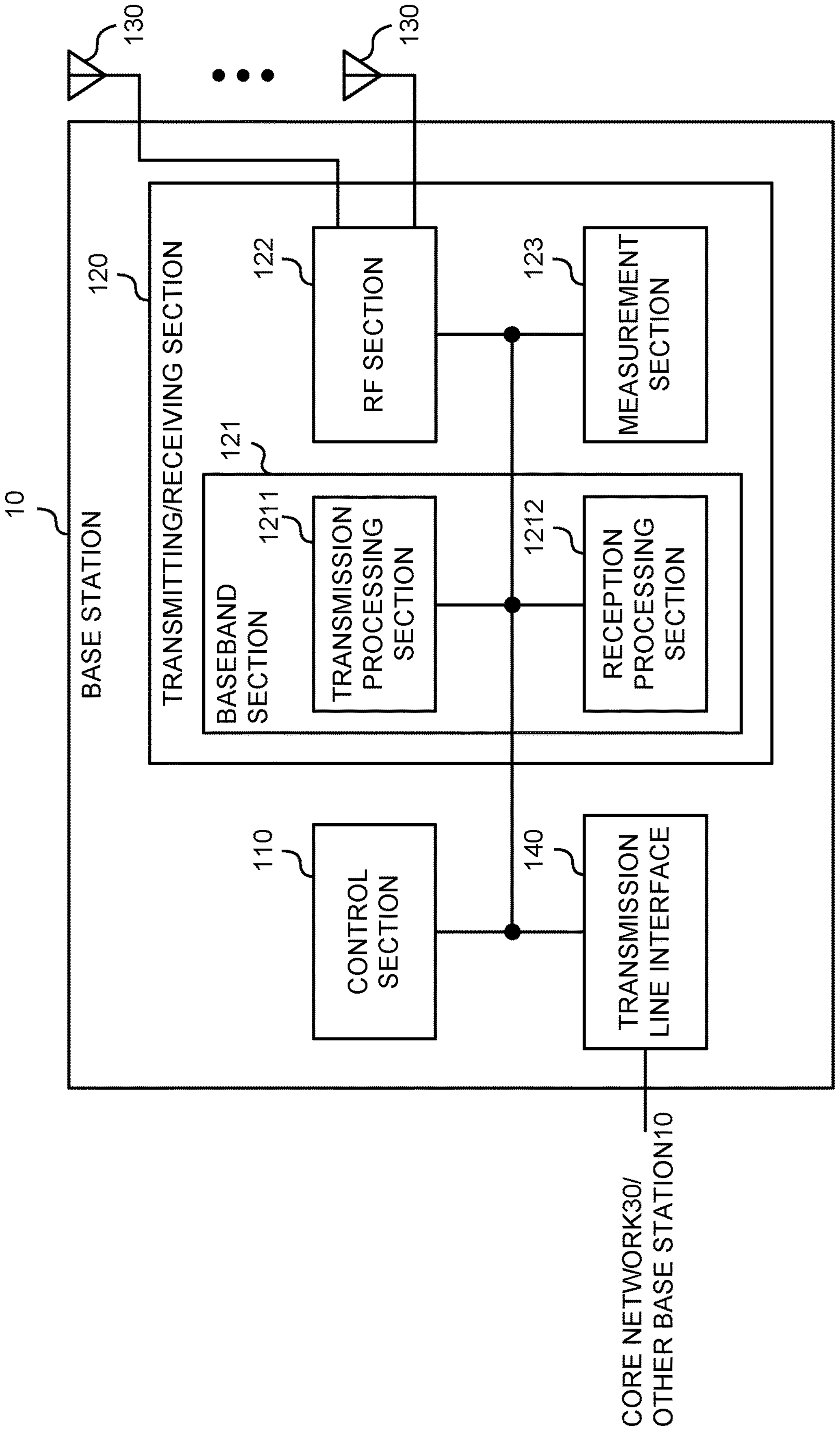
FIG. 12 is a diagram to show an example of a structure of a base station according to one embodiment.

FIG. 12 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

The control section 110 may determine a transmission configuration indication (TCI) state to apply to a physical downlink shared channel (PDSCH), based on at least one of whether Doppler pre-compensation is applied to the PDSCH, a frequency range, a magnitude relation between an offset from reception of downlink control information (DCI) for scheduling the PDSCH to reception of the PDSCH and a threshold value, and the DCI (field of the DCI). The transmitting/receiving section 120 may transmit the PDSCH by using the TCI state (first to third embodiments).

(User Terminal)

Figure 13:
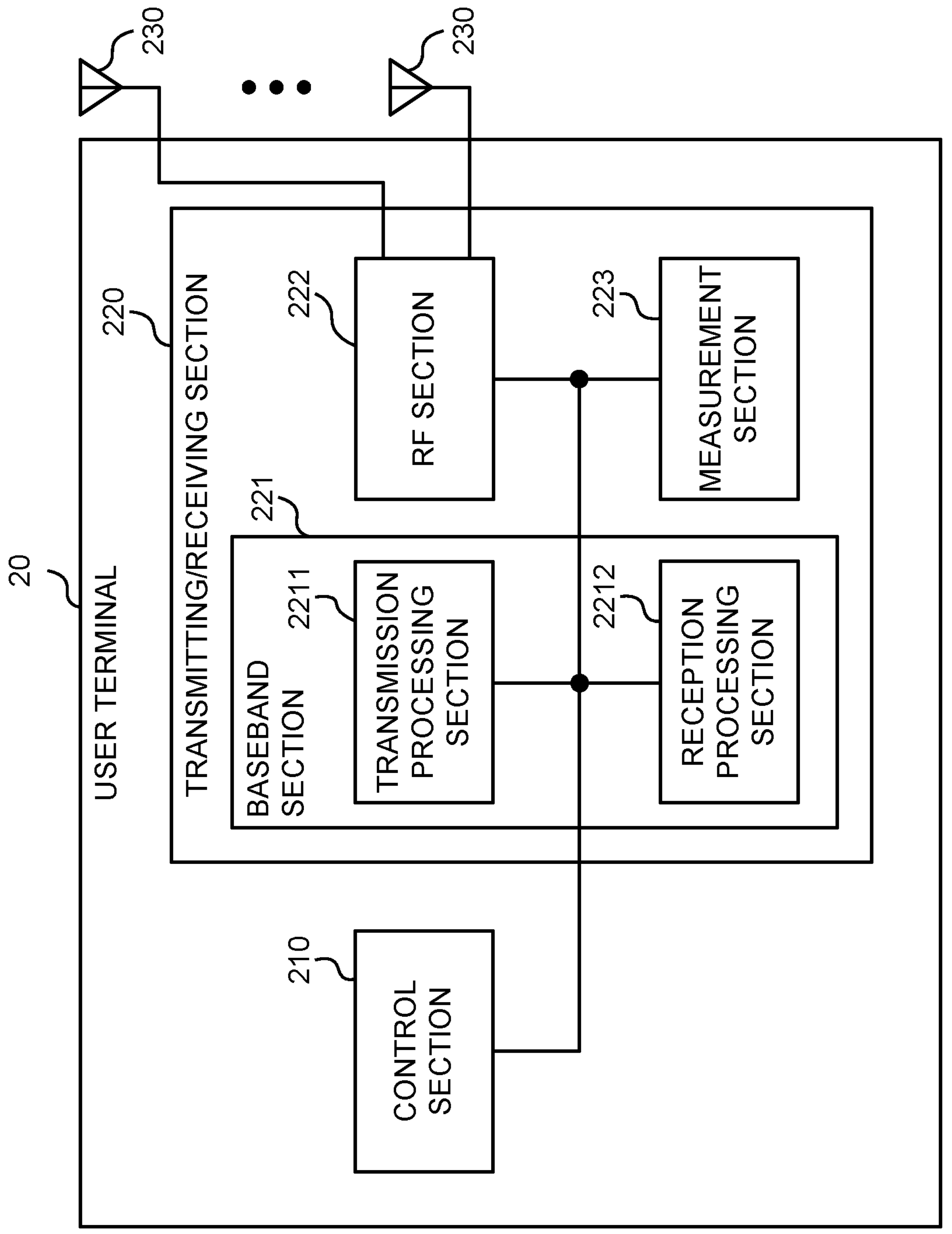
FIG. 13 is a diagram to show an example of a structure of a user terminal according to one embodiment.

FIG. 13 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The control section 210 may determine a transmission configuration indication (TCI) state to apply to a physical downlink shared channel (PDSCH), based on at least one of whether Doppler pre-compensation is applied to the PDSCH, a frequency range, a magnitude relation between an offset from reception of downlink control information (DCI) for scheduling the PDSCH to reception of the PDSCH and a threshold value, and the DCI (field of the DCI). The transmitting/receiving section 220 may receive the PDSCH by using the TCI state (first to third embodiments).

When the frequency range is a frequency range higher than a specific frequency value and the Doppler pre-compensation is applied to the PDSCH, the TCI state may be associated with a specific control resource set. When the default TCI state includes two TCI states, the control section 210 may drop a specific quasi-co-location parameter of a specific TCI state of the two TCI states (first embodiment).

When the frequency range is a frequency range lower than a specific frequency value and a TCI field is not included in the DCI, the TCI state may be associated with a control resource set corresponding to the DCI (second embodiment).

When the frequency range is a frequency range higher than a specific frequency value, the offset is smaller than the threshold value, and a TCI field is not included in the DCI, the control section 210 may determine the TCI state, based on at least one of a TCI state related to a specific control resource set and an active TCI state list for the PDSCH (third embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 14:
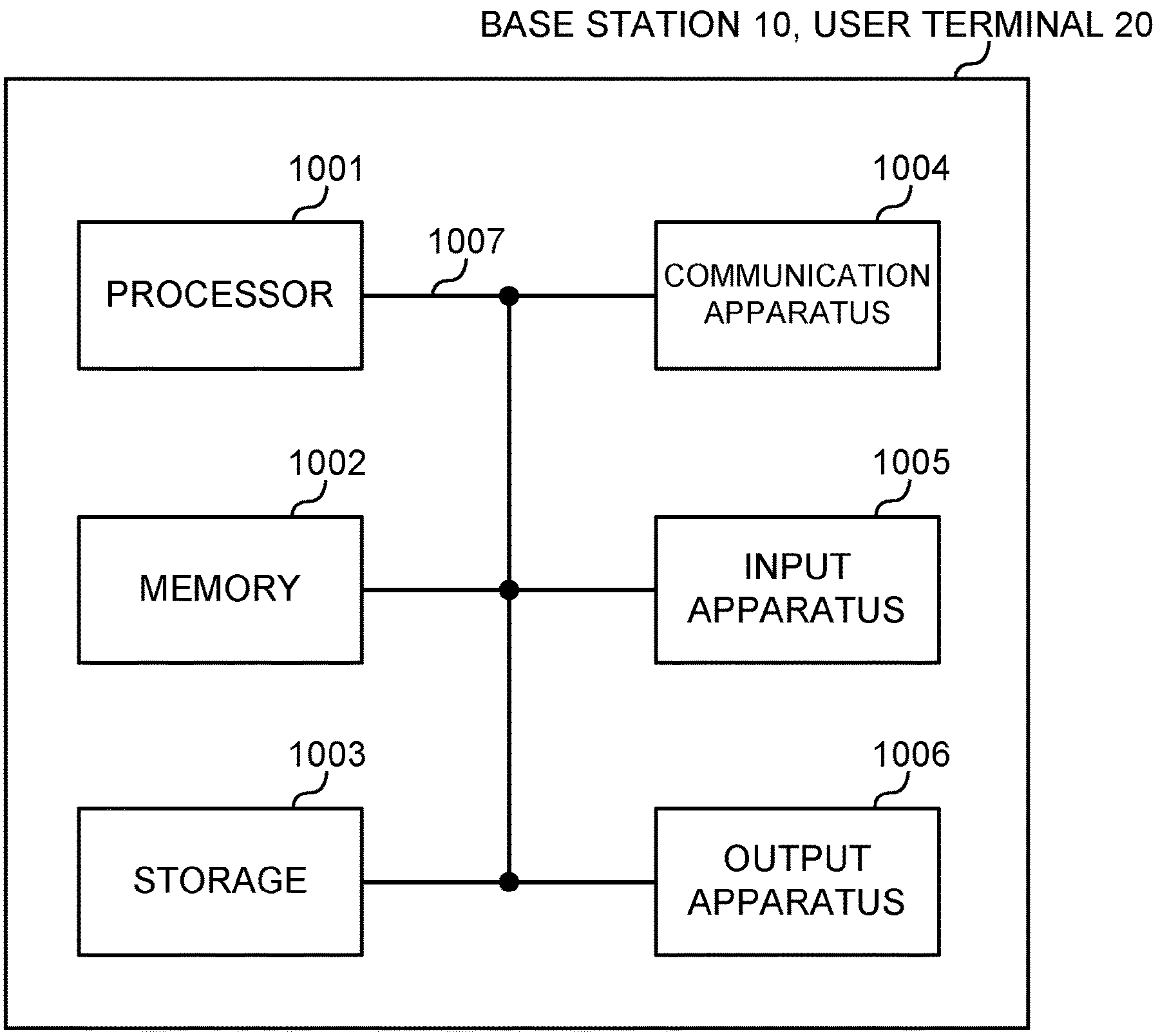
FIG. 14 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 14 is a diagram to show an example of a hardware structure of the base station and the user terminal according to one embodiment.

Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI)), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be a device mounted on a moving object or a moving object itself, and so on.

The moving object is a movable object with any moving speed, and naturally a case where the moving object is stopped is also included. Examples of the moving object include a vehicle, a transport vehicle, an automobile, a motorcycle, a bicycle, a connected car, a loading shovel, a bulldozer, a wheel loader, a dump truck, a fork lift, a train, a bus, a trolley, a rickshaw, a ship and other watercraft, an airplane, a rocket, a satellite, a drone, a multicopter, a quadcopter, a balloon, and an object mounted on any of these, but these are not restrictive. The moving object may be a moving object that autonomously travels based on a direction for moving.

The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor.

Figure 15:
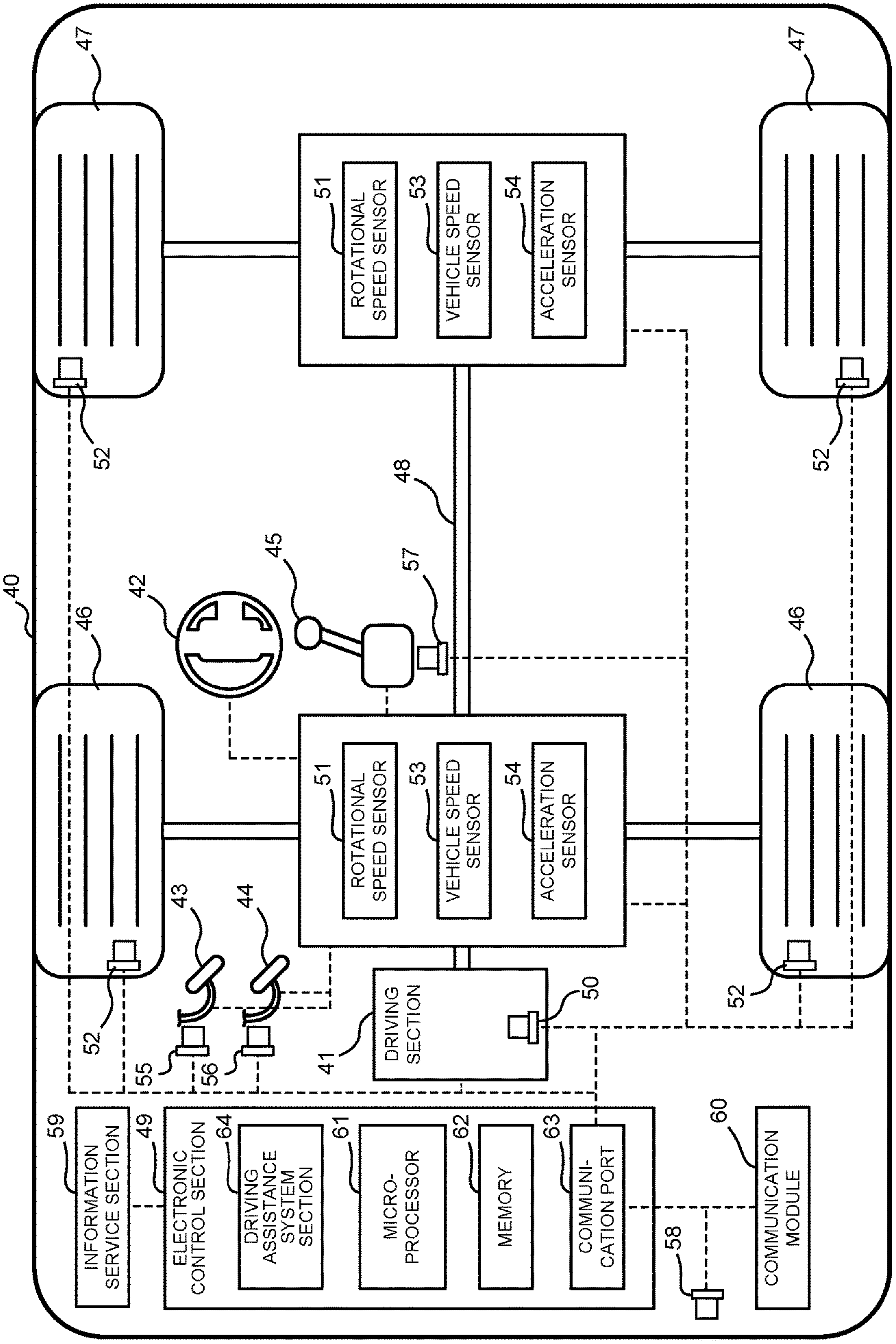
FIG. 15 is a diagram to show an example of a vehicle according to one embodiment.

FIG. 15 is a diagram to show an example of a vehicle according to one embodiment. As shown in FIG. 15, a vehicle 40 includes a driving section 41, a steering section 42, an accelerator pedal 43, a brake pedal 44, a shift lever 45, right and left front wheels 46, right and left rear wheels 47, an axle 48, an electronic control section 49, various sensors (including a current sensor 50, a rotational speed sensor 51, a pneumatic sensor 52, a vehicle speed sensor 53, an acceleration sensor 54, an accelerator pedal sensor 55, a brake pedal sensor 56, a shift lever sensor 57, and an object detection sensor 58), an information service section 59, and a communication module 60.

The driving section 41 includes, for example, at least one of an engine, a motor, and a hybrid of an engine and a motor. The steering section 42 at least includes a steering wheel, and is configured to steer at least one of the front wheels 46 and the rear wheels 47, based on operation of the steering wheel operated by a user.

The electronic control section 49 includes a microprocessor 61, a memory (ROM, RAM) 62, and a communication port (for example, an input/output (IO) port) 63. The electronic control section 49 receives, as input, signals from the various sensors 50 to 58 included in the vehicle. The electronic control section 49 may be referred to as an Electronic Control Unit (ECU).

Examples of the signals from the various sensors 50 to 58 include a current signal from the current sensor 50 for sensing current of a motor, a rotational speed signal of the front wheels 46/rear wheels 47 acquired by the rotational speed sensor 51, a pneumatic signal of the front wheels 46/rear wheels 47 acquired by the pneumatic sensor 52, a vehicle speed signal acquired by the vehicle speed sensor 53, an acceleration signal acquired by the acceleration sensor 54, a depressing amount signal of the accelerator pedal 43 acquired by the accelerator pedal sensor 55, a depressing amount signal of the brake pedal 44 acquired by the brake pedal sensor 56, an operation signal of the shift lever 45 acquired by the shift lever sensor 57, and a detection signal for detecting an obstruction, a vehicle, a pedestrian, and the like acquired by the object detection sensor 58.

The information service section 59 includes various devices for providing various pieces of information such as drive information, traffic information, and entertainment information, such as a car navigation system, an audio system, a speaker, a display, a television, and a radio, and one or more ECUs that control these devices. The information service section 59 provides various pieces of information/services (for example, multimedia information/multimedia service) for an occupant of the vehicle 40, using information acquired from an external apparatus via the communication module 60 and the like.

A driving assistance system section 64 includes various devices for providing functions for preventing an accident and reducing a driver's driving load, such as a millimeter wave radar, Light Detection and Ranging (LiDAR), a camera, a positioning locator (for example, a Global Navigation Satellite System (GNSS) and the like), map information (for example, a high definition (HD) map, an autonomous vehicle (AV) map, and the like), a gyro system (for example, an inertial measurement apparatus (inertial measurement unit (IMU)), an inertial navigation apparatus (inertial navigation system (INS)), and the like), an artificial intelligence (AI) chip, and an AI processor, and one or more ECUs that control these devices. The driving assistance system section 64 transmits and receives various pieces of information via the communication module 60, and implements a driving assistance function or an autonomous driving function.

The communication module 60 can communicate with the microprocessor 61 and the constituent elements of the vehicle 40 via the communication port 63. For example, via the communication port 63, the communication module 60 transmits and receives data (information) to and from the driving section 41, the steering section 42, the accelerator pedal 43, the brake pedal 44, the shift lever 45, the right and left front wheels 46, the right and left rear wheels 47, the axle 48, the microprocessor 61 and the memory (ROM, RAM) 62 in the electronic control section 49, and the various sensors 50 to 58, which are included in the vehicle 40.

The communication module 60 can be controlled by the microprocessor 61 of the electronic control section 49, and is a communication device that can perform communication with an external apparatus. For example, the communication module 60 performs transmission and reception of various pieces of information to and from the external apparatus via radio communication. The communication module 60 may be either inside or outside the electronic control section 49. The external apparatus may be, for example, the base station 10, the user terminal 20, or the like described above. The communication module 60 may be, for example, the above-describe base station 10 or user terminal 20 or the like (may function as the base station 10 or user terminal 20 or the like).

The communication module 60 may transmit signals from the above-described various sensors 50 to 58 input to the electronic control section 49 and information obtained based on these signals, to the external apparatus via radio communication.

The communication module 60 receives various pieces of information (traffic information, signal information, inter-vehicle distance information, and the like) transmitted from the external apparatus, and displays the various pieces of information on the information service section 59 included in the vehicle. The communication module 60 stores the various pieces of information received from the external apparatus in the memory 62 that can be used by the microprocessor 61. Based on the pieces of information stored in the memory 62, the microprocessor 61 may perform control of the driving section 41, the steering section 42, the accelerator pedal 43, the brake pedal 44, the shift lever 45, the right and left front wheels 46, the right and left rear wheels 47, the axle 48, the various sensors 50 to –58, and the like included in the vehicle 40.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG (where x is, for example, an integer or a decimal)), Future Radio Access (FRA), New-Radio Access Technology (PAT), New Radio (NR), New radio access (NX), Future generation radio access (FX), Global System for Mobile communications (GSM (registered trademark)), CDMA 2000, Ultra Mobile Broadband (U4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced, modified, created, or defined based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a processor that determines a transmission configuration indication (TCI) state to apply to a physical downlink shared channel (PDSCH), based on at least one of: whether a specific single frequency network (SFN) scheme is applied to the PDSCH; a frequency range; a magnitude relation between an offset from reception of downlink control information (DCI) for scheduling the PDSCH to reception of the PDSCH and a threshold value; and the DCI; and a receiver that receives the PDSCH by using the TCI state, wherein in response to the frequency range being a frequency range higher than a specific frequency value and the specific SFN scheme being applied to the PDSCH, the TCI state is associated with a specific control resource set, and wherein in response to the TCI state including two TCI states, the processor ignores a specific quasi co-location parameter of a specific TCI state of the two TCI states.

2. The terminal according to claim 1, wherein the specific SFN scheme is a scheme in which Doppler pre-compensation is applied.

3. The terminal according to claim 1, wherein in response to the frequency range being a frequency range lower than the specific frequency value and the DCI not including a TCI field, the TCI state is associated with a control resource set corresponding to the DCI.

4. The terminal according to claim 1, wherein in response to the frequency range being a frequency range higher than the specific frequency value, the offset being smaller than the threshold value, and the DCI not including a TCI field, the processor determines the TCI state, based on at least one of a QCL assumption related to a specific control resource set and an active TCI state list for the PDSCH.

5. A radio communication method for a terminal, comprising:

determining a transmission configuration indication (TCI) state to apply to a physical downlink shared channel (PDSCH), based on at least one of: whether a specific single frequency network (SFN) scheme is applied to the PDSCH; a frequency range; a magnitude relation between an offset from reception of downlink control information (DCI) for scheduling the PDSCH to reception of the PDSCH and a threshold value; and the DCI; and receiving the PDSCH by using the TCI state, wherein in response to the frequency range being a frequency range higher than a specific frequency value and the specific SFN scheme being applied to the PDSCH, the TCI state is associated with a specific control resource set, and wherein in response to the TCI state including two TCI states, the method further comprises ignoring a specific quasi co-location parameter of a specific TCI state of the two TCI states.

6. A base station comprising:

a processor that determines a transmission configuration indication (TCI) state to apply to a physical downlink shared channel (PDSCH), based on at least one of: whether a specific single frequency network (SFN) scheme is applied to the PDSCH; a frequency range; a magnitude relation between an offset from reception of downlink control information (DCI) for scheduling the PDSCH to reception of the PDSCH and a threshold value; and the DCI; and a transmitter that transmits the PDSCH by using the TCI state, wherein in response to the frequency range being a frequency range higher than a specific frequency value and the specific SFN scheme being applied to the PDSCH, the TCI state is associated with a specific control resource set, and wherein in response to the TCI state including two TCI states, a specific quasi co-location parameter of a specific TCI state of the two TCI states is ignored.

7. A system comprising a terminal and a base station, wherein the terminal comprises:

a processor that determines a transmission configuration indication (TCI) state to apply to a physical downlink shared channel (PDSCH), based on at least one of: whether a specific single frequency network (SFN) scheme is applied to the PDSCH; a frequency range; a magnitude relation between an offset from reception of downlink control information (DCI) for scheduling the PDSCH to reception of the PDSCH and a threshold value; and the DCI; and a receiver that receives the PDSCH by using the TCI state, wherein in response to the frequency range being a frequency range higher than a specific frequency value and the specific SFN scheme being applied to the PDSCH, the TCI state is associated with a specific control resource set, and wherein in response to the TCI state including two TCI states, the processor ignores a specific quasi co-location parameter of a specific TCI state of the two TCI states, and the base station comprises:

a processor that determines the TCI state based on at least one of: whether the specific SFN scheme is applied; the frequency range; the magnitude relation between the offset and the threshold value; and the DCI; and a transmitter that transmits the PDSCH by using the TCI state.

* * * * *